United States Patent
Marin et al.

(10) Patent No.: US 10,273,321 B2
(45) Date of Patent: Apr. 30, 2019

(54) PROCESS OF POLYMERIZATION CATALYST PRODUCTION WITH CONTROLLED CATALYST PROPERTIES AND USE OF SAME IN OLEFIN POLYMERIZATIONS

(71) Applicant: W.R. Grace & Co.-Conn., Columbia, MD (US)

(72) Inventors: Vladimir P. Marin, Houston, TX (US); Ahmed Hintolay, Sugar Land, TX (US); Michael Donald Spencer, Houston, TX (US)

(73) Assignee: W.R. Grace & Co.-Conn., Columbia, MD (US)

( * ) Notice: Subject to any disclaimer, the term of this patent is extended or adjusted under 35 U.S.C. 154(b) by 0 days.

(21) Appl. No.: 15/385,503

(22) Filed: Dec. 20, 2016

(65) Prior Publication Data

US 2017/0096503 A1    Apr. 6, 2017

Related U.S. Application Data

(63) Continuation of application No. 14/075,691, filed on Nov. 8, 2013, now Pat. No. 9,593,182.

(60) Provisional application No. 61/724,043, filed on Nov. 8, 2012.

(51) Int. Cl.
*C08F 110/06* (2006.01)

(52) U.S. Cl.
CPC .................... *C08F 110/06* (2013.01)

(58) Field of Classification Search
None
See application file for complete search history.

(56) References Cited

U.S. PATENT DOCUMENTS

| | | | |
|---|---|---|---|
| 4,784,983 A | 11/1988 | Mao et al. | |
| 4,861,847 A | 8/1989 | Mao et al. | |
| 6,376,417 B1 * | 4/2002 | Yang | B01J 31/0201 502/121 |
| 6,617,278 B1 | 9/2003 | Jin et al. | |
| 6,683,017 B2 | 1/2004 | Gao et al. | |
| 6,703,339 B2 | 3/2004 | Li et al. | |
| 7,202,314 B2 | 4/2007 | Morini et al. | |
| 7,388,060 B2 | 6/2008 | Wang et al. | |
| 8,003,559 B2 | 8/2011 | Chang | |
| 8,227,370 B2 | 7/2012 | Chang | |
| 2002/0028893 A1 | 3/2002 | Cheng et al. | |
| 2010/0184930 A1 | 7/2010 | Yi et al. | |
| 2011/0207901 A1 | 8/2011 | Chang | |
| 2012/0035338 A1 | 2/2012 | Tan et al. | |
| 2013/0196847 A1 | 8/2013 | Tan et al. | |

FOREIGN PATENT DOCUMENTS

| | | |
|---|---|---|
| EP | 2520594 | 7/2012 |
| EP | 2520591 | 11/2012 |
| EP | 2617739 | 7/2013 |
| WO | 2010144079 | 12/2010 |
| WO | WO2012034357 | 3/2012 |
| WO | WO2012778510 | 7/2012 |
| WO | WO2013082631 | 6/2013 |

OTHER PUBLICATIONS

International Search Report and Written Opinion dated Dec. 27, 2013 on Application No. PCT/US2003/069245.

* cited by examiner

*Primary Examiner* — Catherine S Branch
(74) *Attorney, Agent, or Firm* — Lowenstein Sandler LLP

(57) ABSTRACT

Solid catalyst components for use in olefin polymerization, olefin polymerization catalyst systems containing the solid catalyst components, methods of making the solid catalyst components and the catalyst systems, and methods of polymerizing and copolymerizing olefins involving the use of the catalyst systems. The solid catalyst components are formed by (a) dissolving a magnesium compound and an auxiliary intermediate electron donor in at least one first solvent to form a solution; (b) contacting a first titanium compound with said solution to form a precipitate of the magnesium compound and the first titanium compound; (c) washing the precipitate with a mixture of a second titanium compound and at least one second solvent and optionally an electron donor at a temperature of up to 90° C.; and (d) treating the precipitate with a mixture of a third titanium compound and at least one third solvent at 90-150° C. to form a solid catalyst component.

20 Claims, No Drawings

PROCESS OF POLYMERIZATION CATALYST PRODUCTION WITH CONTROLLED CATALYST PROPERTIES AND USE OF SAME IN OLEFIN POLYMERIZATIONS

CROSS-REFERENCE TO RELATED APPLICATIONS

The present application is a continuation of U.S. Non-Provisional patent application Ser. No. 14/075,691, filed on Nov. 8, 2013, which claims the benefit of priority of U.S. Provisional Patent Application No. 61/724,043, filed on Nov. 8, 2012, wherein the contents of each are hereby incorporated by reference herein in their entirety.

TECHNICAL FIELD

The present disclosure relates to a process for the production of magnesium dihalide solid catalyst components, supported Ziegler-Natta catalysts made therefrom with controlled catalyst properties and methods for making polyolefins therefrom.

BACKGROUND

Polyolefins are a class of polymers derived from simple olefins. Known methods of making polyolefins involve the use of Ziegler-Natta polymerization catalysts. These catalysts polymerize vinyl monomers using a transition metal halide to provide a polymer with an isotactic stereochemical configuration.

One type of Ziegler-Natta catalyst system comprises a solid catalyst component, constituted by a magnesium dihalide on which are supported a titanium compound and an internal electron donor compound. In order to maintain high selectivity for an isotactic polymer product, a variety of internal electron donor compounds must be added during catalyst synthesis. Conventionally, when a higher crystallinity of the polymer is required, an external donor compound is also added during the polymerization reaction.

During the past 30 years, numerous supported Ziegler-Natta catalysts have been developed which afford a much higher activity in olefin polymerization reactions and much higher content of crystalline isotactic fractions in the polymers they produce. With the development of internal and external electron donor compounds, polyolefin catalyst systems are continuously renovated.

U.S. Pat. Nos. 4,784,983 and 4,861,847 describe a catalyst system for use in olefinic polymerization and copolymerization that is comprised of components (A), (B) and (C). The catalyst component (A) consisting essentially of titanium, magnesium, halogen, polycarboxylic acid esters and organic phosphorus compounds is a solid product, being prepared by mixing titanium tetrahalide and auxiliary precipitant with a homogeneous solution of magnesium halide in a solvent system consisting essentially of an organic epoxy compound and an organic phosphorus compound to form a solid product which is then treated with a polycarboxylic acid ester and titanium tetrahalide. Component (B) is an organic aluminum compound, and component (C) is an organic silicon compound. The catalyst system has a very high activity, and the resultant polymers have very high stereospecificity and good granular appearance.

U.S. Pat. No. 6,376,417 describes a catalyst for the polymerization of propylene comprising components (A), (B) and (C). Component (A) is a solid product prepared by dissolving a halide of magnesium in a solvent system consisting of an organic epoxy compound, an organic phosphorus compound and an inert diluent to form a homogeneous solution; mixing the homogeneous solution with a halide of titanium to form a mixture; precipitating a solid from the mixture in the presence of an auxiliary precipitant; treating the solid with a polycarboxylic ester to load the ester on the solid; and treating the ester-loaded solid with the halide of titanium and the inert diluent. Component (B) is an organic aluminum compound, and component (C) is an organic silicon compound. The particle size of the catalyst can be adjusted by increasing the amount of the inert diluent at a low ratio of the epoxy compound to the phosphorus compound. However, in some cases, increasing the particle size by increasing the amount of inert diluent results in irregular catalyst morphology, for example, broadening particle size distribution, particle elongation, or reduction of bulk density. In addition, the increasing amount of the inert diluent to produce a larger particle size catalyst can be limited by the reactor size in a production scale.

The general production scheme for $MgCl_2$ supported catalysts includes a process to make $MgCl_2$ support, impregnation of $TiCl_4$ and internal donor to the $MgCl_2$ surface and the catalyst activation. One of the methods of $MgCl_2$ supported catalyst preparation is dissolution of solid $MgCl_2$ with organic reagents and precipitation of $MgCl_2$ with certain morphology. Catalyst morphology control is one of the most important aspects of industrial polyolefin plant operation. Catalyst morphology characteristics include particle size and particle size distribution, particle shape, bulk density, and stickiness. Catalyst morphology characteristics influence plant operation efficiency, polymerization kinetics and final polymer morphology. For example, unsuitable catalyst morphology may cause failure in polymer morphology control, which can lead to serious trouble in plant operation, such as fouling or sheeting.

Because of these reasons, $MgCl_2$ supported catalysts with good morphology control (required particle size and shape, narrow particle size distribution, high bulk density and low stickiness) are desired.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Rather, the sole purpose of this summary is to present some concepts of the invention in a simplified form as a prelude to the more detailed description that is presented hereafter.

It is desired to improve the production process of catalyst particles by shortening the process time, using less solvent, and improving the catalyst morphology, such as particle size distribution, particle shape, bulk density, and less catalyst agglomeration. It has been found that faster production processes can be obtained with the use of less solvent by the use of particular washing steps. Such washing steps can also improve catalyst morphology. It has also been found that the catalyst morphology can be affected by the use of particular auxiliary intermediate electron donors in particular amounts in the magnesium compound dissociation step.

A method for improving the morphology of a solid catalyst component for use in olefinic polymerization is disclosed. Various embodiments are listed below. It will be understood that the embodiments listed below may be combined not only as listed below, but in other suitable combinations.

One embodiment involves controlling the morphology (particle size and particle size distribution, particle shape, bulk density, stickiness) of magnesium compound supported catalysts by varying the auxiliary precipitants present in the magnesium compound solution.

A second embodiment involves reducing the stickiness of magnesium compound supported catalysts particularly those having internal electron donor compounds containing 16 or more carbon atoms.

The catalyst composition formed during catalyst synthesis is variable and also affects catalyst properties such as catalyst stereospecificity (isotacticity). Specifically, it was found that the amount of phthalic anhydride used in the dissolution of magnesium compound and the wash conditions can affect the isotacticity of the catalyst.

Provided is a process for preparing a solid catalyst component for use in olefinic polymerization, the process including the following steps:

(a) dissolving a magnesium compound and an auxiliary intermediate electron donor in at least one first solvent to form a solution;

(b) contacting a first titanium compound with the solution to form a precipitate of the magnesium compound and the first titanium compound;

(c) washing the precipitate with a mixture of a second titanium compound and at least one second solvent at a temperature of up to 90° C.; and (d) treating the precipitate with a mixture of a third titanium compound and at least one third solvent at 90-150° C.

Also provided are catalyst particles for use in olefinic polymerization formed by a process including the following steps:

(a) dissolving a magnesium compound and an auxiliary intermediate electron donor in at least one first solvent to form a solution;

(b) contacting a first titanium compound with the solution to form a precipitate of the magnesium compound and the first titanium compound;

(c) washing the precipitate with a mixture of a second titanium compound and at least one second solvent and optionally an electron donor at a temperature of up to 90° C.; and (d) treating the precipitate with a mixture of a third titanium compound and at least one third solvent at 90-150° C.

Also provided is a method of polymerizing or copolymerizing an olefin, comprising the steps of:

contacting an olefin with a catalyst system made by a process comprising the following steps:

(a) dissolving a magnesium compound and an auxiliary intermediate electron donor in at least one first solvent to form a solution;

(b) contacting a first titanium compound with the solution to form a precipitate of the magnesium compound and the first titanium compound;

(c) washing the precipitate with a mixture of a second titanium compound and at least one second solvent and optionally an electron donor at a temperature of up to 90° C.;

(d) treating the precipitate with a mixture of a third titanium compound and at least one third solvent at 90-150° C. to form a solid catalyst component; and (e) contacting the solid catalyst component with an external electron donor compound and organoaluminum compound to form the catalyst system.

The following paragraphs apply to the preceding methods and to the preceding catalyst particles:

In some embodiments, the first, second and third titanium compounds are identical. In further embodiments, the first, second and third titanium compounds are different from one another. In yet further embodiments, two of the first, second and/or third titanium compounds are identical.

In some embodiments, the first, second and third solvents are identical. In further embodiments, the first, second and third solvents are different from one another. In yet further embodiments, two of the first, second and/or third solvents are identical.

In some embodiments, the first, second and/or third titanium compound is a halide. In further embodiments, the titanium halide is $TiCl_4$.

In some embodiments, in step (a) the amount of auxiliary intermediate electron donor is from about 0.01 to about 0.5 mole per mole of magnesium compound in the solution.

In some embodiments, in step (a) the at least one first solvent includes at least one of alcohol, epoxy compound, or phosphorus compound. In further embodiments, the at least one first solvent may further include other inert solvents. In further embodiments, the epoxy compound includes at least one of aliphatic epoxy compounds, alicyclic epoxy compounds, or aromatic epoxy compounds. In yet further embodiments, the epoxy compound includes at least one of halogenated aliphatic epoxy compounds, aliphatic epoxy compounds having a keto group, aliphatic epoxy compounds having an ether bond, aliphatic epoxy compounds having an ester bond, aliphatic epoxy compounds having a tertiary amino group, aliphatic epoxy compounds having a cyano group, halogenated alicyclic epoxy compounds, alicyclic epoxy compounds having a keto group, alicyclic epoxy compounds having an ether bond, alicyclic epoxy compounds having an ester bond, alicyclic epoxy compounds having a tertiary amino group, alicyclic epoxy compounds having a cyano group, halogenated aromatic epoxy compounds, aromatic epoxy compounds having a keto group, aromatic epoxy compounds having an ester bond, aromatic epoxy compounds having a tertiary amino group, or aromatic epoxy compounds having a cyano group.

In yet further embodiments, the epoxy compound includes at least one of ethylene oxide, propylene oxide, 1,2-epoxybutane, 2,3-epoxybutane, 1,2-epoxyhexane, 1,2-epoxyoctane, 1,2-epoxydecane, 1,2-epoxydodecane, 1,2-epoxytetradecane, 1,2-epoxyhexadecane, 1,2-epoxyoctadecane, 7,8-epoxy-2-methyloctadecane, 2-vinyl oxirane, 2-methyl-2-vinyl oxirane, 1,2-epoxy-5-hexene, 1,2-epoxy-7-octene, 1-phenyl-2,3-epoxypropane, 1-(1-naphthyl)-2,3-epoxypropane, 1-cyclohexyl-3,4-epoxybutane, 1,3-butadiene dioxide, 1,2,7,8-diepoxyoctane, cyclopentene oxide, cyclooctene oxide, alpha-pinene oxide, 2,3-epoxynorbornane, limonene oxide, cyclodecane epoxide, 2,3,5,6-diepoxynorbornane, styrene oxide, 3-methylstyrene oxide, 1,2-epoxybutylbenzene, 1,2-epoxyoctylbenzene, stilbene oxide, 3-vinylstyrene oxide, 1-(1-methyl-1,2-epoxyethyl)-3-(1-methylvinyl benzene), 1,4-bis(1,2-epoxypropyl)benzene, 1,3-bis(1,2-epoxy-1-methylethyl)benzene, 1,4-bis(1,2-epoxy-1-methylethyl)benzene, epifluorohydrin, epichlorohydrin, epibromohydrin, hexafluoropropylene oxide, 1,2-epoxy-4-fluorobutane, 1-(2,3-epoxypropyl)-4-fluorobenzene, 1-(3,4-epoxybutyl)-2-fluorobenzene, 1-(2,3-epoxypropyl)-4-chlorobenzene, 1-(3,4-epoxybutyl)-3-chlorobenzene, 4-fluoro-1,2-cyclohexene oxide, 6-chloro-2,3-epoxybicyclo

[2.2.1]heptane, 4-fluorostyrene oxide, 1-(1,2-epoxypropyl)-3-trifluorobenzene, 3-acetyl-1,2-epoxypropane, 4-benzoyl-1,2-epoxybutane, 4-(4-benzoyl)phenyl-1,2-epoxybutane, 4,4'-bis(3,4-epoxybutyl)benzophenone, 3,4-epoxy-1-cyclohexanone, 2,3-epoxy-5-oxobicyclo[2.2.1]heptane, 3-acetylstyrene oxide, 4-(1,2-epoxypropyl)benzophenone, glycidyl methyl ether, butyl glycidyl ether, 2-ethylhexyl glycidyl ether, allyl glycidyl ether, ethyl 3,4-epoxybutyl ether, glycidyl phenyl ether, glycidyl 4-tert-butylphenyl ether, glycidyl 4-chlorophenyl ether, glycidyl 4-methoxyphenyl ether, glycidyl 2-phenylphenyl ether, glycidyl 1-naphthyl ether, glycidyl 2-phenylphenyl ether, glycidyl 1-naphthyl ether, glycidyl 4-indolyl ether, glycidyl N-methyl-alpha-quinolon-4-yl ether, ethyleneglycol diglycidyl ether, 1,4-butanediol diglycidyl ether, 1,2-diglycidyloxybenzene, 2,2-bis(4-glycidyloxyphenyl)propane, tris(4-glycidyloxyphenyl)methane, poly(oxypropylene)triol triglycidyl ether, a glycidic ether of phenol novolac, 1,2-epoxy-4-methoxycyclohexane, 2,3-epoxy-5,6-dimethoxybicyclo[2.2.1]heptane, 4-methoxystyrene oxide, 1-(1,2-epoxybutyl)-2-phenoxybenzene, glycidyl formate, glycidyl acetate, 2,3-epoxybutyl acetate, glycidyl butyrate, glycidyl benzoate, diglycidyl terephthalate, poly(glycidyl acrylate), poly(glycidyl methacrylate), a copolymer of glycidyl acrylate with another monomer, a copolymer of glycidyl methacrylate with another monomer, 1,2-epoxy-4-methoxycarbonylcyclohexane, 2,3-epoxy-5-butoxycarbonylbicyclo[2.2.1]heptane, ethyl 4-(1,2-epoxyethyl)benzoate, ethyl 3-(1,2-epoxybutyl)benzoate, methyl 3-(1,2-epoxybutyl)-5-pheylbenzoate, N,N-glycidyl-methylacetamide, N,N-ethylglycidylpropionamide, N,N-glycidyl-methylbenzamide, N-(4,5-epoxypentyl)-N-methyl-benzamide, N,N-diglycylaniline, bis(4-diglycidylaminophenyl)methane, poly(N,N-glycidylmethylacrylamide), 1,2-epoxy-3-(diphenylcarbamoyl)cyclohexane, 2,3-epoxy-6-(dimethylcarbamoyl)bicycle[2.2.1]heptane, 2-(dimethylcarbamoyl)styrene oxide, 4-(1,2-epoxybutyl)-4'-(dimethylcarbamoyl)biphenyl, 4-cyano-1,2-epoxybutane, 1-(3-cyanophenyl)-2,3-epoxybutane, 2-cyanostyrene oxide, or 6-cyano-1-(1,2-epoxy-2-phenylethyl)naphthalene.

In some embodiments, step (b), (c) and/or (d) further include adding an electron donor and/or an auxiliary intermediate electron donor. In further embodiments, the electron donor is a carboxylic acid ester or organic compound containing keto and ether groups. In further embodiments, the carboxylic acid ester is phthalate or 1,8-naphthyl dibenzoate. In further embodiments, the phthalate contains more than 4 carbon atoms in a chain. In further embodiments, the organic compound is 1-[9-(methoxymethyl)fluoren-9-yl]alkan-1-one.

In some embodiments, in step (c) and/or (d) the at least one first and/or second solvent is an aromatic organic solvent. In further embodiments, in step (c) and/or (d) the at least one first and/or second solvent is one of toluene or ethyl benzene. In further embodiments, in step (c) the second titanium compound is at a concentration of from about 2% to about 50% of the mixture, or 5% to about 50% of the mixture.

In some embodiments, the auxiliary intermediate electron donor reacts with titanium halide to form a secondary electron donor with chlorine atom and is one of an aldehyde, anhydride, ketone or ester. In further embodiments, the auxiliary intermediate electron donor is phthalic anhydride.

In some embodiments, the concentration of the auxiliary intermediate electron donor is less than 1% by weight of total internal donor content of the solid catalyst component. In further embodiments, the concentration of the auxiliary intermediate electron donor is 1-50% by weight of total internal donor content of the solid catalyst component. In yet further embodiments, the concentration of the auxiliary intermediate electron donor is 5-30%, 5-15%, or 5-10% by weight of total internal donor content of the solid catalyst component.

In some embodiments, the magnesium compound includes at least one of magnesium chloride, magnesium bromide, magnesium iodide, magnesium fluoride, methoxy magnesium chloride, ethoxy magnesium chloride, isopropoxy magnesium chloride, butoxy magnesium chloride, octoxy magnesium chloride, phenoxy magnesium chloride, methylphenoxy magnesium chloride, ethoxy magnesium, isopropoxy magnesium, butoxy magnesium, n-octoxy magnesium, 2-ethyloxy magnesium, phenoxy magnesium, dimethylphenoxy magnesium, magnesium laurate, or magnesium stearate. In further embodiments, the magnesium compound is $MgCl_2$.

In some embodiments, the catalyst particles have a diameter of from about 8 μm to about 50 μm, or about 20 μm to about 50 μm.

DETAILED DESCRIPTION

Before describing several exemplary embodiments, it is to be understood that the invention is not limited to the details of construction or process steps set forth in the following description. The invention is capable of other embodiments and of being practiced or being carried out in various ways.

Reference throughout this specification to "one embodiment," "certain embodiments," "one or more embodiments" or "an embodiment" means that a particular feature, structure, material, or characteristic described in connection with the embodiment is included in at least one embodiment. Thus, the appearances of the phrases such as "in one or more embodiments," "in certain embodiments," "in one embodiment" or "in an embodiment" in various places throughout this specification are not necessarily referring to the same embodiment. Furthermore, the particular features, structures, materials, or characteristics may be combined in any suitable manner in one or more embodiments.

Although reference herein is to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

Described are solid catalyst components for use in olefin polymerization, olefin polymerization catalyst systems containing the solid catalyst components, methods of making the solid catalyst components and the catalyst systems, and methods of polymerizing and copolymerizing olefins involving the use of the catalyst systems. The solid catalyst components include titanium, magnesium, halogen, and optional internal electron donor compounds. The methods of polymerizing or copolymerizing olefins involve contacting olefins with catalyst systems containing a solid catalyst component, an organoaluminum compound, and an organosilicon compound.

An exemplary method for preparing a solid catalyst component for use in olefinic polymerization includes the steps of: i) dissolving a magnesium halide compound in a solvent mixture including an organic epoxy compound, an organic phosphorus compound, auxiliary precipitants and an optional inert diluent, to form a homogeneous solution; ii) treating the above solution with a titanium compound to precipitate a solid precipitate containing magnesium and titanium, optionally in the presence of at least one internal electron donor compound; iii) washing the solid precipitate with an inert diluent and iv) treating the washed solid precipitate with at least one titanium compound to form a treated solid catalyst component; wherein the morphology of the solid precipitate is controlled by varying the amount of auxiliary precipitants present in the solution during precipitation of the solid precipitate from about 0.01 to about 0.5 mole per mole of magnesium halide in the homogeneous solution.

Another exemplary method for preparing a solid catalyst component for use in olefinic polymerization includes the steps of: i) dissolving a magnesium halide compound in a solvent mixture including an organic epoxy compound, an organic phosphorus compound, and an optional inert diluent, to form a homogeneous solution; ii) treating the above solution with a titanium compound, optionally in the presence of at least one internal electron donor compound, to precipitate a solid precipitate containing magnesium and titanium; and iii) washing the solid precipitate with a mixture of at least one titanium compound, with at least one internal electron donor compound and/or at least one inert diluent; iv) treating the washed solid precipitate with at least one titanium compound in presence of an inert diluent, optionally in the presence of at least one internal electron donor compound, to form a treated solid catalyst component, v) washing the solid catalyst component with an inert diluent.

Yet another exemplary method for preparing a solid catalyst component for use in olefinic polymerization includes the steps of: i) dissolving a magnesium halide compound in a solvent mixture including an organic epoxy compound, an organic phosphorus compound, auxiliary precipitants and an optional inert diluent, to form a homogeneous solution; ii) treating the above solution with a titanium compound, optionally in the presence of at least one internal electron donor compound, to precipitate a solid precipitate containing magnesium and titanium; iii) washing the solid precipitate with a mixture of at least one titanium compound, with at least one internal electron donor compound and/or at least one inert diluent and; iv) treating the washed solid precipitate with at least one titanium compound in presence of an inert diluent, optionally in the presence of at least one internal electron donor compound, to form a treated solid catalyst component, v) washing the solid catalyst component with an inert diluent; wherein the morphology of the solid precipitate is controlled by varying the amount of auxiliary precipitants present in the solution during precipitation of the solid precipitate from about 0.01 to about 0.5 mole per mole of magnesium halide in the homogeneous solution.

Yet another method for preparing a solid catalyst component for use in olefinic polymerization includes the steps of: i) dissolving a magnesium halide compound in a solvent mixture including an organic epoxy compound, an organic phosphorus compound, auxiliary precipitants and an optional inert diluent, to form a homogeneous solution; ii) treating the above solution with a titanium compound to precipitate a solid precipitate containing magnesium and titanium, optionally in the presence of at least one internal electron donor compound; ii) washing the solid precipitate with an inert diluent and iv) wherein the morphology of the solid precipitate is controlled by varying the amount of auxiliary precipitants present in the solution during precipitation of the solid precipitate from about 0.01 to about 0.5 mole per mole of magnesium halide in the homogeneous solution.

Another embodiment relates to controlling the morphology of the solid precipitate by varying the amount of auxiliary precipitants present in the solution during precipitation of the solid precipitate from about 0.01 to about 0.5 mole per mole of magnesium halide in the homogeneous solution and amount of inert diluent or/and amount of epoxy organic compound.

A further embodiment relates to a method for preparing a catalyst component wherein the wash step is conducted with $TiCl_4$ and aromatic solvent mixture at concentrations from about 5 to about 65 $TiCl_4$ vol % at temperatures ranging from about 10 to about 85° C.

The catalysts/methods of embodiments of the invention can in some instances lead to the production of poly-alpha-olefins having xylene solubles (XS) from about 0.5% to about 10%. In another embodiment, poly-alpha-olefins having xylene solubles (XS) from about 1.5% to about 8% are produced. XS refers to the percent of solid polymer that dissolves into xylene. A low XS % value generally corresponds to a highly isotactic polymer (i.e. higher crystallinity), whereas a high XS % value generally corresponds to a low isotactic polymer. Different steps of the methods for producing the catalysts result in catalysts that can produce polymers with different XS values.

The solid catalyst component can be a highly active catalyst component comprising a reaction product of a titanium compound, a magnesium compound, and an optional internal electron donor compound.

The titanium compounds used in the preparation of the solid catalyst component include, for example, a tetravalent titanium compound represented by chemical formula (I):

$$Ti(OR)_gX_{4-g} \qquad (I),$$

wherein R represents a hydrocarbon group, such as an alkyl group having 1 to about 20 carbon atoms, X represents a halogen atom, and 0≤g≤4. Specific examples of the titanium compound include, but are not limited to titanium tetrahalides such as $TiCl_4$, $TiBr_4$ and $TiI_4$; alkoxytitanium trihalides such as $Ti(OCH_3)Cl_3$, $Ti(OC_2H_5)Cl_3$, $Ti(O-n-C_4H_9)Cl_3$, $Ti(OC_2H_5)Br_3$ and $Ti(O-i-C_4H_9)Br_3$; dialkoxytitanium dihalides such as $Ti(OCH_3)_2Cl_2$, $Ti(OC_2H_5)_2Cl_2$, $Ti(O-nC_4H_9)_2Cl_2$ and $Ti(OC_2H_5)_2Br_2$; trialkoxytitanium monohalides such as $Ti(OCH_3)_3Cl$, $Ti(OC_2H_5)_3Cl$, $Ti(O-n-C_4H_9)_3Cl$ and $Ti(OC_2H_5)_3Br$; and tetraalkoxytitaniums such as $Ti(OCH_3)_4$, $Ti(OC_2H_5)_4$ and $Ti(O-n-C_4H_9)_4$. In some embodiments, the halogen containing titanium compounds, such as titanium tetrahalides, are used. These titanium compounds may be used individually or in solutions of hydrocarbon compounds or halogenated hydrocarbons.

The magnesium compounds used in the preparation of the solid catalyst component include, for example, a magnesium compound having no reducibility. In one embodiment, the magnesium compound having no reducibility is a halogen-containing magnesium compound. Specific examples of the magnesium compound having no reducibility include, but are not limited to magnesium halides such as magnesium chloride, magnesium bromide, magnesium iodide and magnesium fluoride; alkoxy magnesium halides such as methoxy magnesium chloride, ethoxy magnesium chloride, isopropoxy magnesium chloride, butoxy magnesium chloride and octoxy magnesium chloride; aryloxy magnesium halides such as phenoxy magnesium chloride and methylphenoxy magnesium chloride; alkoxy magnesiums such as ethoxy magnesium, isopropoxy magnesium, butoxy magnesium, n-octoxy magnesium and 2-ethylhexoxy magnesium; aryloxy magnesiums such as phenoxy magnesium and dimethyl phenoxy magnesium; and carboxylic acid salts of magnesium such as magnesium laurate and magnesium stearate. These magnesium compounds may be in the liquid or solid state. In one aspect, halogen containing magnesium compounds, such as magnesium chloride, alkoxy magnesium chlorides and aryloxy magnesium chlorides, are employed.

When preparing the solid catalyst component, an internal electron donor compound can be used/added. The solid titanium catalyst component can be made by contacting a magnesium compound and a titanium compound with an internal electron donor compound. In one embodiment, the solid titanium catalyst component is made by contacting a magnesium compound and a titanium compound optionally in the presence of an internal electron donor compound. In another embodiment, the solid titanium catalyst component is made by forming a magnesium based catalyst support optionally with the titanium compound and optionally with the internal electron donor compound, and contacting the magnesium based catalyst support with the titanium compound and the internal electron donor compound.

Examples of internal electron donors include oxygen-containing electron donors such as organic acid esters. Specific examples include, but are not limited to diethyl ethylmalonate, diethyl propylmalonate, diethyl isopropylmalonate, diethyl butylmalonate, diethyl 1,2-cyclohexanedicarboxylate, di-2-ethylhexyl1,2-cyclohexanedicarboxylate, di-2-isononyl1,2-cyclohexanedicarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, ethyl anisate, ethyl ethoxybenzoate, diisononyl phthalate, di-2-ethylhexyl phthalate, diethyl succinate, dipropyl succinate, diisopropyl succinate, dibutyl succinate, diisobutyl succinate, dioctyl succinate, diisononyl succinate, and diether compounds such as 9,9-bis(methoxymethyl)fluorine, 2-isopropyl-2-isopentyl-1,3-dimethoxypropane, 2,2-diisobutyl-1,3-dimethoxypropane, 2,2-diisopentyl-1,3-dimethoxypropane, 2-isopropyl-2-cyclohexyl-1,3-dimethoxypropane.

The internal electron donor compounds may be used individually or in combination. In employing the internal electron donor compounds, they do not have to be used directly as starting materials, but compounds convertible to electron donors in the course of preparing the solid catalyst components may also be used as the starting materials.

The solid catalyst component can be made by contacting a magnesium compound and a titanium compound with an internal electron donor compound.

In one embodiment, the solid catalyst component is made by contacting a magnesium compound and a titanium compound in the presence of an internal electron donor compound. In another embodiment, the solid catalyst component is made by forming a magnesium-based catalyst support optionally with a titanium compound and optionally with an internal electron donor compound and contacting the magnesium-based catalyst support with the titanium compound and the internal electron donor compound. In yet another embodiment, the solid catalyst component is made by contacting a magnesium compound solution with a titanium compound to form a mixture, then contacting the mixture with an internal electron donor. In still yet another embodiment, the solid catalyst component is made by contacting a magnesium compound solution with a titanium compound to form a mixture, then contacting the mixture with an internal electron compound, then contacting the mixture again with the internal electron donor compound. Such repeated contact with the internal electron donor compound can occur once, twice, three times, four times or more, successively or with other acts performed between contacts with additional doses of the internal electron donor compounds.

Generally speaking, a magnesium compound solution is made by dissolving a magnesium compound with an auxiliary intermediate electron donor in a solvent including at least one of an alcohol, an epoxy compound, or a phosphorus compound, and an optional inert diluent to form a homogenous solution.

The epoxy compounds can include compounds having at least one epoxy group in the form of monomers, dimmers, oligomers and polymers. Examples of epoxy compounds include, but are not limited to aliphatic epoxy compounds, alicyclic epoxy compounds, aromatic epoxy compounds, or the like. Examples of aliphatic epoxy compounds include, but are not limited to halogenated aliphatic epoxy compounds, aliphatic epoxy compounds having a keto group, aliphatic epoxy compounds having an ether bond, aliphatic epoxy compounds having an ester bond, aliphatic epoxy compounds having a tertiary amino group, aliphatic epoxy compounds having a cyano group, or the like. Examples of alicyclic epoxy compounds include, but are not limited to halogenated alicyclic epoxy compounds, alicyclic epoxy compounds having a keto group, alicyclic epoxy compounds having an ether bond, alicyclic epoxy compounds having an ester bond, alicyclic epoxy compounds having a tertiary amino group, alicyclic epoxy compounds having a cyano group, or the like. Examples of aromatic epoxy compounds include, but are not limited to halogenated aromatic epoxy compounds, aromatic epoxy compounds having a keto group, aromatic epoxy compounds having an ether bond, aromatic epoxy compounds having an ester bond, aromatic epoxy compounds having a tertiary amino group, aromatic epoxy compounds having a cyano group, or the like.

Specific examples of epoxy compounds include, but are not limited to epifluorohydrin, epichlorohydrin, epibromohydrin, hexafluoropropylene oxide, 1,2-epoxy-4-fluorobutane, 1-(2,3-epoxypropyl)-4-fluorobenzene, 1-(3,4-epoxybutyl)-2-fluorobenzene, 1-(2,3-epoxypropyl)-4-chlorobenzene, 1-(3,4-epoxybutyl)-3-chlorobenzene, or the like. Specific examples of halogenated alicyclic epoxy compounds include 4-fluoro-1,2-cyclohexene oxide, 6-chloro-2,3 epoxybicyclo[2,2,1]heptane, or the like. Specific examples of halogenated aromatic epoxy compounds include 4-fluorostyrene oxide, 1-(1,2-epoxypropyl)-3-trifluorobenzene, or the like.

The phosphorus compounds can include, but are not limited to hydrocarbyl esters and halohydrocarbyl esters of ortho-phosphoric acid and phosphorous acid. Specific examples include, but are not limited to trimethyl phosphate, triethyl phosphate, tributyl phosphate, triphenyl phosphate, trimethyl phosphite, triethyl phosphite, tributyl phosphite and triphenyl phosphite.

For more sufficiently dissolving a magnesium compound, an inert diluent is optionally added in the solvent mixture. The inert diluent can typically be aromatic hydrocarbons or alkanes, as long as it can facilitate the dissolution of the magnesium compound. Examples of aromatic hydrocarbons include, but are not limited to benzene, toluene, xylene, chlorobenzene, dichlorobenzene, trichlorobenzene, chlorotoluene, and derivatives thereof. Examples of alkanes include linear, branched, or cyclic alkanes having about 3 to about 30 carbons, such as butane, pentane, hexane, cyclohexane, heptanes, and the like. These inert diluents may be used alone or in combination.

In embodiments of making the solid catalyst component, the magnesium compound solution is mixed with a titanium compound such as liquid titanium tetrahalide to form a solid precipitate in the optional presence of an auxiliary precipitant. The auxiliary precipitant may be added before, during or after the precipitation of the solids and loaded on the solids.

The auxiliary precipitants can include carboxylic acids, carboxylic acid anhydrides, ethers, ketones, or mixture thereof. Specific examples include, but are not limited to acetic anhydride, phthalic anhydride, succinic anhydride, maleic anhydride, 1,2,4,5-benzene tetracarboxylic dianhydride, acetic acid, propionic acid, butyric acid, acrylic acid, methacrylic acid, acetone, methyl ethyl ketone, benzophenone, dimethyl ether, diethyl ether, dipropyl ether, dibutyl ether, and dipentyl ether. Preferred is phthalic anhydride.

An auxiliary intermediate electron donor can be converted during catalyst synthesis to chloro-derivatives that might be present in the final catalyst composition. It was found that an auxiliary intermediate electron donor, phthalic anhydride, is converted to phthaloyl chloride, a secondary electron donor. The phthaloyl chloride is coordinated to the $MgCl_2$ surface and can serve as internal donor together with other internal donors, such as phthalates that are used in the catalyst preparation. The amount of phthaloyl chloride on the final catalyst depends on the amount of phthalic anhydride used and the catalyst preparation (wash steps, concentration of $TiCl_4$ and activation conditions). In some catalyst compositions, the amount of phthaloyl chloride in the final catalyst is less than 1% and therefore, less effective in the catalyst composition. In other catalyst compositions, the amount of phthaloyl chloride is 1-10% and the presence of this compound is more effective towards improving catalyst properties such as catalyst isotacticity (XS). In addition, the effect of the phthaloyl chloride depends on the amount of internal donor used, placement of the internal donor and $TiCl_4$ treatment. Usually, it depends on steric and electronic features of the auxiliary intermediate electron donor and the secondary electron donor and their ability to coordinate on the $MgCl_2$ surface.

The process of solids precipitation can be carried out by at least one of three methods. One method involves mixing a titanium compound such as liquid titanium tetrahalide with a magnesium compound solution at a temperature in the range of about 40 degree Celsius to about 0 degree Celsius, and precipitating the solids while the temperature is raised slowly to a range of about 30 degrees Celsius to about 120 degrees Celsius, such as from about 60 degrees Celsius to about 100 degrees Celsius. The second method involves adding a titanium compound dropwise into a magnesium compound solution at low or room temperature to precipitate out solids immediately. The third method involves adding a first titanium compound dropwise into a magnesium compound solution and mixing a second titanium compound with the magnesium compound solution. In these methods, an internal electron donor compound can be present in the reaction system. The internal electron donor compound can be added either after the magnesium compound solution is obtained or after the solid precipitate is formed.

In one embodiment, when the solid catalyst component is formed, a surfactant can be used. The surfactant can contribute to many of the beneficial properties of the solid catalyst component and catalyst system. General examples of surfactants include polymer surfactants, such as polyacrylates, polymethacrylates, polyalkyl methacrylates, and the like. A polyalkyl methacrylate is a polymer that may contain one or more methacrylate monomers, such as at least two different methacrylate monomers, at least three different methacrylate monomers, etc. Moreover, the acrylate and methacrylate polymers may contain monomers other than acrylate and methacrylate monomers, so long as the polymer surfactant contains at least about 40% by weight acrylate and methacrylate monomers.

In one embodiment, non-ionic surfactants and/or anionic surfactants can be used. Examples of non-ionic surfactants and/or anionic surfactants include, but are not limited to phosphate esters, alkyl sulfonates, aryl sulfonates, alkylaryl sulfonates, linear alkyl benzene sulfonates, alkylphenols, ethoxylated alcohols, carboxylic esters, fatty alcohols, fatty esters, fatty aldehydes, fatty ketones, fatty acid nitriles, benzene, naphthalene, anthracene, succinic anhydride, phthalic anhydrides, rosin, terpene, phenol, or the like. In fact, a number of anhydride surfactants are effective. In some instances, the absence of an anhydride surfactant causes the formation of very small catalyst support particles while the over-use creates straw shaped material sometimes referred to as needles.

A solid catalyst precursor can be formed in the following way. In a solvent such as toluene, a magnesium and titanium containing solution is formed following the addition of a halogenating agent such as $TiCl_4$ into a magnesium based solution at relatively cooler temperatures, such as −25 degrees Celsius until about 0 degrees Celsius. An oil phase is then formed, which can be dispersed into the hydrocarbon phase that is stable until about 40 degrees Celsius. The resultant magnesium material becomes a semi-solid at this point and the particle morphology is now determined. The semi-solid converts to a solid between about 40 degrees Celsius and about 80 degrees Celsius.

To facilitate obtaining uniform solid particles, the process of precipitation can be carried out slowly. When the second method of adding titanium halide dropwise at low or room temperature is applied, the process may take place over a period from about 1 hour to about 6 hours. When the first method of raising the temperature in a slow manner is applied, the rate of temperature increase can range from about 4 degrees Celsius to about 125 degrees Celsius per hour.

The solid precipitate is first separated from the mixture. In the solid precipitate, thus obtained, may be entrained a variety of complexes and byproducts, so that further treatment may in some instances be necessary. In one embodiment, the solid precipitate is washed to substantially remove the byproducts from the solid precipitate.

The solid precipitate can be washed with an inert diluent or with a mixture of a titanium compound and an inert diluent. The titanium compound used in this treatment can be identical to or different from the titanium compound used for forming the solid precipitate. The wash step is conducted at a temperature below 90° C. (specifically from about 20 to about 85° C.). The wash temperature is lower than the temperature for the treatment step (activation step) in order to remove effectively all side products from previous steps before conducting the activation step. The wash step prior to the activation step improves catalyst production and catalyst morphology. In the wash step, different concentrations of $TiCl_4$ in inert solvent can be used. The concentration can be from about 5 to about 50 vol % $TiCl_4$ in the inert solvent, such as toluene. Optionally, the wash step can include an internal electron donor compound. It was found that different concentrations of $TiCl_4$ during the wash step effects the catalyst isotacticity and can be used to vary the isotacticity of the resulting polymer. Specifically, changing the $TiCl_4$ concentration from 0 to 50 vol % in the wash step results in increasing isotacticity levels of the resulting polymer up to 40% as measured by XS.

The washed solid precipitant is treated with a titanium compound or a mixture of a titanium compound and an inert diluent. The titanium compound used in this treatment can be identical to or different from the titanium compound used for forming the solid precipitate. The amount of titanium compound used is from about 1 to about 20 moles, such as from about 2 to about 15 moles, per mole of magnesium compound in the support. The treatment temperature ranges from about 90 degrees Celsius to about 150 degrees Celsius, such as from about 90 degrees Celsius to about 100 degrees Celsius. If a mixture of titanium tetrahalide and an inert diluent is used to treat the solid precipitate, the volume % of titanium tetrahalide in the treating solution is from about 5% to about 100%, the rest being the inert diluent. By treating the solid precipitate with the titanium compound and optionally an inert diluent, the byproducts in the solid precipitate can be removed from the treated solid precipitate. In one embodiment, the solid precipitate is treated with the titanium compound and optionally an inert diluent about two times or more and five times or less.

The treated solids can be further washed with an inert diluent to remove ineffective titanium compounds and other byproducts. The inert diluent herein used can be hexane, heptane, octane, 1,2-dichloroethane, benzene, toluene, ethyl benzene, xylene, and other hydrocarbons.

By washing the solid precipitate with an inert diluent, a free titanium compound in the solid precipitate can be removed from the solid precipitate. As a result, the resultant solid precipitate does not substantially contain a free titanium compound. In one embodiment, the solid precipitate is treated repeatedly with an inert diluent until the filtrate contains about 100 ppm or less of titanium. In another embodiment, the solid precipitate is treated repeatedly with an inert diluent until the filtrate contains about 50 ppm or less of titanium. In yet another embodiment, the solid precipitate is treated with an inert diluent until the filtrate contains about 10 ppm or less of titanium. In some embodiments, the solid precipitate is treated with an inert diluent about three times or more and seven times or less.

In some embodiments, the solid catalyst component contains from about 0.5 to about 6.0 wt % titanium; from about 10 to about 25 wt % magnesium; from about 40 to about 70 wt % halogen; the chloro auxiliary precipitant derivative (phthaloyl chloride) from 0.1 to 10%; if present, from about 1 to about 50 wt % internal electron donor compound; and optionally inert diluent from about 0 to about 15 wt %.

In another embodiment, the solid catalyst component contains from about 2 to about 25 wt % of one or more of the internal electron donor compounds. In yet another embodiment, the solid catalyst component contains from about 5 to about 20 wt % of one or more of the internal electron donor compounds.

The amounts of the ingredients used in preparing the solid catalyst component may vary depending upon the method of preparation. In one embodiment, from about 0.01 to about 5 moles of the internal electron donor compounds and from about 0.01 to about 500 moles of the titanium compounds are used per mole of the magnesium compound used to make the solid catalyst component. In another embodiment, from about 0.05 to about 2 moles of the internal electron donor compounds and from about 0.05 to about 300 moles of the titanium compounds are used per mole of the magnesium compound used to make the solid catalyst component.

In one embodiment, in the solid catalyst component, the atomic ratio of halogen/titanium is from about 4 to about 200; the internal electron donor/titanium mole ratio is from about 0.01 to about 10; and the magnesium/titanium atomic ratio is from about 1 to about 100. In another embodiment, in the solid catalyst component, the atomic ratio of halogen/titanium is from about 5 to about 100; the internal electron donor/titanium mole ratio is from about 0.2 to about 6; and the magnesium/titanium atomic ratio is from about 2 to about 50.

The resulting solid catalyst component generally contains a magnesium halide of a smaller crystal size than commercial magnesium halides and usually has a specific surface area of at least about 5 m²/g, such as from about 10 to about 1,000 m²/g, or from about 100 to about 800 m²/g. Using the wash step with $TiCl_4$/solvent mixture results in increasing the specific surface area and pore volume, which might increase the catalyst activity. Since the above ingredients are unified to form an integral structure of the solid catalyst component, the composition of the solid catalyst component does not substantially change by washing with, for example, hexane.

The solid catalyst component may be used after being diluted with an inorganic or organic compound such as a silicon compound, an aluminum compound, or the like.

The catalyst system may contain at least one organoaluminum compound in addition to the solid catalyst component. Compounds having at least one aluminum-carbon bond in the molecule can be used as the organoaluminum compound. Examples of organoaluminum compounds include compounds of the following chemical formula (III):

$$AlR_nX_{3-n} \quad \text{(III)}$$

In formula (III), R independently represents a hydrocarbon group usually having 1 to about 20 carbon atoms, X represents halogen atoms, and $0 < n \leq 3$.

Specific examples of the organoaluminum compounds represented by formula (III) include, but are not limited to trialkyl aluminums such as triethyl aluminum, tributyl aluminum and trihexyl aluminum; trialkenyl aluminums such as triisoprenyl aluminum; dialkyl aluminum halides such as diethyl aluminum chloride, dibutyl aluminum chloride and diethyl aluminum bromide; alkyl aluminum sesquihalides such as ethyl aluminum sesquichloride, butyl aluminum sesquichloride and ethyl aluminum sesquibromide; alkyl aluminum dihalides such as ethyl aluminum dichloride, propyl aluminum dichloride and butyl aluminum dibromide; dialkyl aluminum hydrides such as diethyl aluminum hydride and dibutyl aluminum hydride; and other partially hydrogenated alkyl aluminum such as ethyl aluminum dihydride and propyl aluminum dihydride.

The organoaluminum compound can be used in the catalyst system in an amount that the mole ratio of aluminum to titanium (from the solid catalyst component) is from about 5 to about 1. In another embodiment, the mole ratio of aluminum to titanium in the catalyst system is from about 10 to about 700. In yet another embodiment, the mole ratio of aluminum to titanium in the catalyst system is from about 25 to about 400.

The catalyst system may contain at least one organosilicon compound in addition to the solid catalyst component. This organosilicon compound is sometimes termed as an external electron donor. The organosilicon compound contains silicon having at least one hydrogen ligand (hydrocarbon group). General examples of hydrocarbon groups include alkyl groups, cycloalkyl groups, (cycloalkyl)methylene groups, alkene groups, aromatic groups, and the like.

The organosilicon compound, when used as an external electron donor serving as one component of a Ziegler-Natta catalyst system for olefin polymerization, contributes to the ability to obtain a polymer (at least a portion of which is polyolefin) having a controllable molecular weight distribution and controllable crystalinity while retaining high performance with respect to catalytic activity.

The organosilicon compound is used in the catalyst system in an amount such that the mole ratio of the organoaluminum compound to the organosilicon compound is from about 2 to about 90. In another embodiment, the mole ratio of the organoaluminum compound to the organosilicon compound is from about 5 to about 70. In yet another embodiment, the mole ration of the organoaluminum compound to the organosilicon compound is from about 7 to about 35.

In one embodiment, the organosilicon compound is represented by chemical formula $$R_n Si(OR')_{4-n} \qquad (IV)$$

wherein each R and R' independently represent a hydrocarbon group, and n is 0≤n<4.

Specific examples of the organosilicon compound of formula (IV) include, but are not limited to trimethylmethoxysilane, trimethylethoxysilane, dimethyldimethoxysilane, dimethyldiethoxysilane, diisopropyldimethoxysilane, diisobutyldimethoxysilane, t-butylmethyldimethoxysilane, t-butylmethyldiethoxysilane, t-amylmethyldiethoxysilane, dicyclopentyldimethoxysilane, diphenyldimethoxysilane, phenylmethyldimethoxysilane, diphenyldiethoxysilane, bis-o-tolydimethoxysilane, bis-m-tolydimethoxysilane, bis-p-tolydimethoxysilane, bis-p-tolydiethoxysilane, bisethylphenyldimethoxysilane, dicyclohexyldimethoxysilane, cyclohexylmethyldimethoxysilane, cyclohexylmethyldiethoxysilane, ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, gamma-chloropropyltrimethoxysilane, methyltriethoxysilane, ethyltriethoxysilane, vinyltriethoxysilane, t-butyltriethoxysilane, nbutyltriethoxysilane, isobutyltriethoxysilane, phenyltriethoxysilane, gammaamniopropyltriethoxysilane, cholotriethoxysilane, ethyltriisopropoxysilane, vinyltriethoxysilane, cyclohexyltrimethoxysilane, cyclohexyltriethoxysilane, 2-norbornanetrimethoxysilane, 2-norboranetriethoxysilane, 2-norboranemethyldimethoxysilane, ethyl silicate, butyl silicate, trimethylphenoxysilane, and methyltriallyloxysilane.

In another embodiment, the organosilicon compound is represented by chemical formula (V):

$$SiRR'_m(OR'')_{3-m} \qquad (V)$$

In the above formula (V), 0≤m<3, such as 0≤m<2; and R independently represents a cyclic hydrocarbon or substituted cyclic hydrocarbon group. Specific examples of the group R include, but are not limited to cyclopropyl; cyclobutyl; cyclopentyl; 2-methylcyclopentyl; 3-methylcyclopentyl; 2-ethylcyclopentyl; 3-propylcyclopentyl; 3-isopropylcyclopentyl; 3-butylcyclopentyl; 3-tertiary butyl cyclopentyl; 2,2-dimethylcyclopentyl; 2,3-dimethylcyclopentyl; 2,5-dimethylcyclopentyl; 2,2,5-trimethylcyclopentyl; 2,3,4,5-tetramethylcyclopentyl; 2,2,5,5-tetramethylcyclopentyl; 1-cyclopentylpropyl; 1-methyl-1-cyclopentylethyl; cyclopentenyl; 2-cyclopentenyl; 3-cyclopentenyl; 2-methyl-1-cyclopentenyl; 2-methyl-3-cyclopentenyl; 3-methyl-3-cyclopentenyl; 2-ethyl-3-cyclopentenyl; 2,2-dimethyl-3-cyclopentenyl; 2,5-dimethyl-3-cyclopentenyl; 2,3,4,5-tetramethyl-3-cyclopentenyl; 2,2,5,5-tetramethyl-3-cyclopentenyl; 1,3-cyclopentadienyl; 2,4-cyclopentadienyl; 1,4-cyclopentadienyl; 2-methyl-1,3-cyclopentadienyl; 2-methyl-2,4-cyclopentadienyl; 3-methyl-2,4-cyclopentadienyl; 2-ethyl-2,4-cyclopentadienyl; 2,2-dimethyl-2,4-cyclopentadienyl; 2,3-dimethyl-2,4-cyclopentadienyl; 2,5-dimethyl-2,4-cyclopentadienyl; 2,3,4,5-tetramethyl-2,4-cyclopentadienyl; indenyl; 2-methylindenyl; 2-ethylindenyl; 2-indenyl; 1-methyl-2-indenyl; 1,3-dimethyl-2-indenyl; indanyl; 2-methylindanyl; 2-indanyl; 1,3-dimethyl-2-indanyl; 4,5,6,7-tetrahydroindenyl; 4,5,6,7-tetrahydro-2-indenyl; 4,5,6,7-tetrahydro-1-methyl-2-indenyl; 4,5,6,7-tetrahydro-1,3-dimethyl-2-indenyl; fluorenyl groups; cyclohexyl; methylcyclohexyls; ethylcylcohexyls; propylcyclohexyls; isopropylcyclohexyls; n-butylcyclohexyls; tertiary-butyl cyclohexyls; dimethylcyclohexyls; and trimethylcyclohexyls.

In formula (V), R' and R" are identical or different and each represents a hydrocarbon. Examples of R' and R" are alkyl, cycloalkyl, aryl and aralkyl groups having 3 or more carbon atoms. Furthermore, R and R' may be bridged by an alkyl group, etc. General examples of organosilicon compounds are those of formula (V) in which R is cyclopentyl group, R' is an alkyl group such as methyl or cyclopentyl group, and R" is an alkyl group, particularly a methyl or ethyl group.

Specific examples of organosilicon compounds of formula (V) include, but are not limited to trialkoxysilanes such as cyclopropyltrimethoxysilane, cyclobutyltrimethoxysilane, cyclopentyltrimethoxysilane, 2-methylcyclopentyltrimethoxysilane, 2,3-dimethylcyclopentyltrimethoxysilane, 2,5-dimethylcyclopentyltrimethoxysilane, cyclopentyltriethoxysilane, cyclopentenyltrimethoxysilane, 3-cyclopentenyltrimethoxysilane, 2,4-cyclopentadienyltrimethoxysilane, indenyltrimethoxysilane and fluorenyltrimethoxysilane; dialkoxysilanes such as dicyclopentyldimethoxysilane, bis(2-methylcyclopentyl)dimethoxysilane, bis(3-tertiary butyl-cyclopentyl)dimethoxysilane, bis(2,3-dimethylcyclopentyl)dimethoxysilane, bis(2,5-dimethylcyclopentyl)dimethoxysilane, dicyclopentyldiethoxysilane, dicyclobutyldiethoxysilane, cyclopropylcyclobutyldiethoxysilane, dicyclopentenyldimethoxysilane, di(3-cyclopentenyl)dimethoxysilane, bis(2,5-dimethyl-3-cyclopentenyl)dimethoxysilane, di-2,4-cyclopentadienyl)dimethoxysilane, bis(2,5-dimethyl-2,4-cyclopentadienyl)dimethoxysilane, bis(1-methyl-1-cyclopentylethyl)dimethoxysilane, cyclopentylcyclopentenyldimethoxysilane, cyclopentylcyclopentadienyldimethoxysilane, diindenyldimethoxysilane, bis(1,3-dimethyl-2-indenyl)dimethoxysilane, cyclopentadienylindenyldimethoxysilane, difluorenyldimethoxysilane, cyclopentylfluorenyldimethoxysilane and indenylfluorenyldimethoxysilane; monoalkoxysilanes such as tricyclopentylmethoxysilane, tricyclopentenylmethoxysilane, tricyclopentadienylmethoxysilane, tricyclopentylethoxysilane, dicyclopentylmethylmethoxysilane, dicyclopentylethylmethoxysilane, dicyclopentylmethylethoxysilane, cyclopentyldimethylmethoxysilane, cyclopentyldiethylmethoxysilane, cyclopentyldimethylethoxysilane, bis(2,5-dimethylcyclopentyl)cyclopentylmethoxysilane, dicyclopentylcyclopentenylmethoxysilane, dicyclopentylcyclopentenadienylmethoxysilane and diindenylcyclopentylmethoxysilane; and ethylenebis-cyclopentyldimethoxysilane.

Polymerization of olefins can be carried out in the presence of the catalyst system described above. Generally speaking, olefins are contacted with the catalyst system described above under suitable conditions to form desired polymer products. In one embodiment, preliminary polymerization described below is carried out before the main polymerization. In another embodiment, polymerization is carried out without preliminary polymerization. In yet another embodiment, the formation of copolymer is carried out using at least two polymerization zones.

In preliminary polymerization, the solid catalyst component is usually employed in combination with at least a portion of the organoaluminum compound. This may be carried out in the presence of part or the whole of the organosilicon compound (external electron donor compound). The concentration of the catalyst system used in the preliminary polymerization may be much higher than that in the reaction system of the main polymerization.

In preliminary polymerization, the concentration of the solid catalyst component in the preliminary polymerization is usually from about 0.01 to about 200 millimoles, or from about 0.05 to about 100 millimoles, calculated as titanium atoms per liter of an inert hydrocarbon medium described below. In one embodiment, the preliminary polymerization is carried out by adding an olefin and the above catalyst system ingredients to an inert hydrocarbon medium and polymerizing the olefin under mild conditions.

Specific examples of the inert hydrocarbon medium include, but are not limited to aliphatic hydrocarbons such as propane, butane, pentane, hexane, heptanes, octane, decane, dodecane and kerosene; alicyclic hydrocarbons such as cyclopentane, cyclohexane and methylcyclopentane; aromatic hydrocarbons such as benzene, toluene and xylene; and mixtures thereof. In certain embodiments, a liquid olefin may be used in place of part or the whole of the inert hydrocarbon medium.

The olefin used in the preliminary polymerization may be the same as, or different from, an olefin to be used in the main polymerization.

The reaction temperature for the preliminary polymerization is sufficient for the resulting preliminary polymer to not substantially dissolve in the inert hydrocarbon medium. In one embodiment, the temperature is from about −20 degrees Celsius to about 100 degrees Celsius. In another embodiment, the temperature is from about −10 degrees Celsius to about 80 degrees Celsius. In yet another embodiment, the temperature is from about 0 degrees Celsius to about 40 degrees Celsius.

Optionally, a molecular-weight controlling agent, such as hydrogen, may be used in the preliminary polymerization. The molecular weight controlling agent is used in such an amount that the polymer obtained by the preliminary polymerization has an intrinsic viscosity, measured in decaliter at 135 degrees Celsius, of at least about 0.2 dl/g, or from about 0.5 to 10 dl/g.

In one embodiment, the preliminary polymerization is carried out so that from about 0.1 g to about 1,000 g of a polymer is formed per gram of the solid catalyst component of the catalyst system. In another embodiment, the preliminary polymerization is carried out so that from about 0.3 g to about 500 g of a polymer is formed per gram of the solid catalyst component. If the amount of the polymer formed by the preliminary polymerization is too large, the efficiency of producing the olefin polymer in the main polymerization may sometimes decrease, and when the resulting olefin polymer is molded into a film or another article, fish eyes tend to occur in the molded article. The preliminary polymerization may be carried out batchwise or continuously.

After the preliminary polymerization conducted as above, or without performing any preliminary polymerization, the main polymerization of an olefin is carried out in the presence of the above-described olefin polymerization catalyst system formed from the solid catalyst component, the organoaluminum compound and the organosilicon compound (external electron donor compound).

Examples of olefins that can be used in the main polymerization are alpha-olefins having 2 to 20 carbon atoms such as ethylene, propylene, 1-butene, 4-methyl-1-pentene, 1-pentene, 1-octene, 1-hexene, 3-methyl-1-pentene, 3-methyl-1-butene, 1-decene, 1-tetradecene, 1-eicosene, and vinylcyclohexane. In exemplary processes, these alpha-olefins may be used individually or in any combination.

In one embodiment, propylene or 1-butene is homopolymerized, or a mixed olefin containing propylene or 1-butene as a main component is copolymerized. When the mixed olefin is used, the proportion of propylene or 1-butene as the main component is usually at least about 50 mole %, or at least about 70 mole %.

By performing the preliminary polymerization, the catalyst system in the main polymerization can be adjusted in the degree of activity. This adjustment tends to result in a powdery polymer having a high bulk density. Furthermore, when the preliminary polymerization is carried out, the particles shape of the resulting polymer becomes spherical, and in the case of slurry polymerization, the slurry attains excellent characteristics while in the case of gas phase polymerization, the polymer seed bed attains excellent characteristics. Furthermore, in these embodiments, a polymer having a high stereoregularity index can be produced with a high catalytic efficiency by polymerizing an alpha-olefin having at least 3 carbon atoms. Accordingly, when producing the propylene copolymer, the resulting copolymer powder or the copolymer becomes easy to handle.

In the homopolymerization of these olefins, a polyunsaturated compound such as conjugated diene or non-conjugated diene may be used as a comonomer. Examples of comonomers include styrene, butadiene, acrylonitrile, acrylamide, alpha-methyl styrene, chlorostyrene, vinyl toluene, divinyl benzene, diallyphthalate, alkyl methacrylates and alkyl acrylates. In one embodiment, the comonomers include thermoplastic and elastomeric monomers. The main polymerization of an olefin is carried out usually in the gaseous or liquid phase. In one embodiment, polymerization (main polymerization) employs a catalyst system containing the solid catalyst component in an amount from about 0.001 to about 0.75 millimoles calculated as Ti atom per liter of the volume of the polymerization zone, the organoaluminum compound in an amount from about 1 to about 2,000 moles per mole of titanium atoms in the solid catalyst component, and the organosilicon compound in an amount from about 0.001 to about 10 moles calculated as Si atoms in the organosilicon compound per mole of the metal atoms in the organoaluminum compound. In another embodiment, polymerization employs a catalyst system containing the solid catalyst component in an amount of from 0.005 to about 0.5 millimoles calculated as Ti atom per liter of the volume of the polymerization zone, the organoaluminum compound in an amount from about 5 to about 500 moles per mole of titanium atoms in the solid catalyst component, and the organosilicon compound in an amount from about 0.01 to about 2 moles calculated as Si atoms in the organosilicon compound per mole of the metal atoms in the organoaluminum compound. In yet another embodiment, polymerization employs a catalyst system containing the alkyl benzoate derivative in an amount from about 0.005 to about 1 mole calculated as Si atoms in the organosilicon compound per mole of the metal atoms in the organoaluminum compound.

When the organoaluminum compound and the organosilicon compound are used partially in the preliminary polymerization, the catalyst system subjected to the preliminary polymerization is used together with the remainder of the catalyst system components. The catalyst system subjected to the preliminary polymerization may contain the preliminary polymerization product.

The use of hydrogen at the time of polymerization promotes and contributes to control of the molecular weight of the resulting polymer, and the polymer obtained may have a high melt flow rate. In this case, the stereoregularity index of the resulting polymer and the activity of the catalyst system can be increased according to the above methods.

In one embodiment, the polymerization temperature is from about 20 degree Celsius to about 200 degrees Celsius. In another embodiment, the polymerization temperature is from about 50 degree Celsius to about 180 degrees Celsius. In one embodiment, the polymerization pressure is typically from atmospheric pressure to about 100 kg/cm². In another embodiment, the polymerization pressure is typically from about 2 kg/cm² to about 50 kg/cm². The main polymerization may be carried out batchwise, semi-continuously or continuously. The polymerization may also be carried out in two or more stages under different reaction conditions.

The olefin polymer so obtained may be a homopolymer, a random copolymer, a block copolymer or an impact copolymer. The impact copolymer contains an intimate mixture of a polyolefin homopolymer and a polyolefin rubber. Examples of polyolefin rubbers include ethylene propylene rubber (EPR) such as ethylene propylene methylene copolymer rubber (EPM) and ethylene propylene diene methylene terpolymer rubber (EPDM).

The olefin polymer obtained by using the catalyst system has a very small amount of an amorphous polymer component and therefore a small amount of a hydrocarbon-soluble component. Accordingly, a film molded from the resultant polymer has low surface tackiness.

The polyolefin obtained by the polymerization process is excellent in particle size distribution, particle diameter and bulk density, and the copolyolefin obtained has a narrow composition distribution. In an impact copolymer, excellent fluidity, low temperature resistance, and a desired balance between stiffness and elasticity can be obtained.

Because PP morphology represents the catalyst morphology, the three parameters of PP morphology (sphericity, symmetry and aspect ratio) collected by Camsizer instrument are used to characterize PP and, therefore, the catalyst morphology.

Camsizer Characteristics:
Sphericity $$SPHT = \frac{4\pi A}{P^2} = \text{Circularity2 (ISO 9276-6)}$$

P—measured perimeter/circumference of a particle projection
A—measured area covered by a particle projection
For an ideal sphere SPHT is expected to be as 1.
Otherwise it is smaller than 1.
Symmetry $$Symm_{0,3} = \frac{1}{2}\left(1 + \min\left(\frac{r_1}{r_2}\right)\right)$$

$r_1$ and $r_2$ are distances from the centre of area to the borders in the measuring direction. For asymmetric particles Symm is <1.
If the centre of area is outside the particle i.e.

$$\frac{r_1}{r_2} < 0$$

Symm is <0.5
$x_{Ma} = r_1 + r_2$ "Symm" is minimum value of measured set of symmetry values from different directions
Aspect ratio $$b/l_{0,2,3} = \frac{x_{cmin}}{x_{Femax}};$$

$x_{e\ min}$ and $x_{Fe\ max}$ out of the measured set of $x_c$ and $x_{Fe}$ values The PP particle morphology characteristics such as sphericity, symmetry and aspect ratio characteristics are increased when increased amount of auxiliary precipitants is used and/or TiCl₄/toluene wash is used. In some processes the sphericity, symmetry and aspect ratio are higher than 0.8, or higher than 0.9.

In one embodiment, propylene and an alpha-olefin having 2 or from about 4 to about 20 carbon atoms are copolymerized in the presence of the catalyst system described above. The catalyst system may be one subjected to the preliminary polymerization described above. In another embodiment, propylene and an ethylene rubber are formed in two reactors coupled in series to form an impact polymer.

The alpha-olefin having 2 carbon atoms is ethylene, and examples of the alpha-olefin having about 4 to about 20 carbon atoms are 1-butene, 1-pentene, 4-methyl-1-pentene, 1-octene, 1-hexene, 3-methyl-1-pentene, 3-methyl-1-butene, 1-decene, vinylcyclohexane, 1-tetradecene, and the like.

In the main polymerization, propylene may be copolymerized with two or more such alpha-olefins. For example, it is possible to copolymerize propylene with ethylene and 1-butene. In one embodiment, propylene is copolymerized with ethylene, 1-butene or ethylene and 1-butene.

Block copolymerization of propylene and another alpha-olefin may be carried out in two stages. The polymerization in a first stage may be the homopolymerization of propylene or the copolymerization of propylene with the other alpha-olefin. In one embodiment, the amount of the monomers polymerized in the first stage is from about 50 to about 95% by weight. In another embodiment, the amount of the monomers polymerized in the first stage is from about 60 to about 90% by weight. This first stage polymerization may be carried out in two or more stages under the same or different polymerization conditions.

In one embodiment, the polymerization in a second stage is carried out such that the mole ratio of propylene to the other alpha-olefin(s) is from about 10/90 to about 90/10. In another embodiment, the polymerization in a second stage is carried out such that the mole ratio of propylene to the other alpha-olefin(s) is from about 20/80 to about 80/20. In yet another embodiment, the polymerization in a second stage is carried out such that the mole ratio of propylene to the other alpha-olefin(s) is from about 30/70 to about 70/30. Producing a crystalline polymer or copolymer of another alpha-olefin may be provided in the second polymerization stage.

The propylene copolymer so obtained may be a random copolymer or the above described block copolymer. This propylene copolymer can contain from about 7 to about 50 mole % of units derived from the alpha-olefin having 2 or from about 4 to about 20 carbon atoms. In one embodiment, a propylene random copolymer contains from about 7 to about 20 mole % of units derived from the alpha-olefin having 2 or from about 4 to about 20 carbon atoms. In another embodiment, the propylene block copolymer contains from about 1 0 to about 50 mole % of units derived from the alpha-olefin having 2 or 4-20 carbon atoms.

In another embodiment, copolymers made with the catalyst system contain from about 50% to about 99% by weight poly-alpha-olefins and from about 1 % to about 50% by weight comonomers (such as thermoplastic or elastomeric monomers). In another embodiment, copolymers made with the catalyst system contain from about 75% to about 98% by weight poly-alpha-olefins and from about 2% to about 25% by weight comonomers.

It should be understood that where there is no reference to the polyunsaturated compound that can be used, the method of polymerization, the amount of the catalyst system and the polymerization conditions, the same description as the above embodiment are applicable.

In one embodiment, the catalyst efficiency (measured as kilogram of polymer produced per gram of catalyst) of the catalyst system is at least about 30. In another embodiment, the catalyst efficiency of the catalyst system is at least about 60.

The catalysts/methods discussed above can in some instances lead to the production of poly-alpha-olefins having melt flow indexes (MFI) from about 0.1 to about 100. The MFI is measured according to ASTM standard D1238. In another embodiment, poly-alpha-olefins having an MFI from about 5 to about 30 are produced. In one embodiment, an impact polypropylene-ethylenepropylene rubber product has an MFI from about 4 to about 10. In another embodiment, an impact polypropyleneethylenepropylene rubber product has an MFI from about 5 to about 9. In some instances a relatively high MFI indicates relatively high catalyst efficiency is obtainable.

The catalysts/methods described above can in some instances lead to the production of poly-alpha-olefins having bulk densities (BD) of at least about 0.3 cc/g. In another embodiment, poly-alpha-olefins having a BD of at least about 0.4 cc/g are produced.

In one embodiment, an impact polypropylene-ethylenepropylene rubber product having a BD of at least about 0.3 cc/g is produced. In another embodiment, an impact polypropylene-ethylenepropylene rubber product having a BD of at least about 0.4 cc/g is produced.

The catalysts/methods described above can lead to the production of poly-alphaolefins having a relatively narrow molecular weight distribution. Polydispersive Index (PI) is strictly connected with the molecular weight distribution of the polymer. PI is calculated as the weight average molecular weight divided by the number average molecular weight, PI=Mw/Mn. In one embodiment, the PI of a polypropylene polymer made with the catalyst system is from about 2 to about 12. In another embodiment, the PI of a polypropylene polymer made with the catalyst system is from about 5 to about 11.

Embodiments of the present invention can lead to the production of a propylene block copolymer and impact copolymers including polypropylene based impact copolymer having one or more excellent melt-flowability, moldability, desirable balance between rigidity and elasticity, good stereospecific control, good control over polymer particle size, shape, size distribution, and molecular weight distribution, and impact strength with a high catalytic efficiency and/or good operability. Employing the catalyst systems containing the solid catalyst component according to embodiments of the present invention yields catalysts simultaneously having high catalytic efficiency, and one or more of excellent melt-flowability, extrudability, moldability, rigidity, elasticity and impact strength.

When making an impact copolymer, polypropylene can be formed in a first reactor while an ethylene propylene rubber can be formed in a second reactor. In this polymerization, the ethylene propylene rubber in the second reactor is formed with the matrix (and particularly within the pores) of the polypropylene formed in the first reactor. Consequently, an intimate mixture of an impact copolymer is formed, wherein the polymer product appears as a single polymer product. Such an intimate mixture cannot be made by simply mixing a polypropylene product with an ethylene propylene rubber product. The systems and reactors can be controlled, optionally with feedback based on continuous or intermittent testing, using a processor equipped with an optional memory and controllers. For example, a processor may be connected to one or more of the reactors, inlets, outlets, testing/measuring systems coupled with the reactors, and the like to monitor and/or control the polymerization process, based on preset data concerning the reactions, and/or based on testing/measuring data generated during a reaction. The controller may control valves, flow rates, the amounts of materials entering the systems, the conditions (temperature, reaction time, pH, etc.) of the reactions, and the like, as instructed by the processor. The processor may contain or be coupled to a memory that contains data concerning various aspects of the polymerization process. With respect to any figure or numerical range for a given characteristic, a figure or a parameter from one range may be combined with another figure or a parameter from a different range for the same characteristic to generate a numerical range. Other than in the operating examples, or where otherwise indicated, all numbers, values and/or expressions referring to quantities of ingredients, reaction conditions, etc., used in the specification and claims are to be understood as modified in all instances by the term "about."

The following examples illustrate embodiments of the present invention. Unless otherwise indicated in the following examples and elsewhere in the specification and claims, all parts and percentages are by weight, all temperatures are in degrees Celsius, and pressure is at or near atmospheric.

The inventors discovered that phthalic anhydride added during the $MgCl_2$ dissolution affects the particle size of catalysts.

Examples 1-4 demonstrate the effect of phthalic anhydride (PA) on particle size of the intermediate (without addition of any internal donor).

The solid catalyst particles were prepared with different amounts of PA added during $MgCl_2$ dissolution. No internal donor was added to the intermediates.

The results demonstrate that increasing the amount of PA from 3.2 to 5.0 g increased the particle size from 14.2 microns to 27.7 microns. The particle size can be increased to 34.9 microns by increasing the amount of toluene in the process. This demonstrates that increasing the amounts of PA and toluene at the same time produces a larger intermediate particle.

Example 1

Preparation of a Solid Titanium Catalyst Component

Anhydrous magnesium chloride (13.2 g, toluene (204 g), epoxy chloropane (26.6 g), tributyl phosphate (26.8 g), and phthalic anhydride (3.2 g) were introduced into a reactor. The mixture was heated at 60° C. for 2 hours with stirring. The solution was cooled to −25° C. Titanium tetrachloride (261 g) was added dropwise over 1 hour. The solution was heated to 80° C., while a solid product was precipitated. The mixture was maintained at 80° C. for 1 hour. The solid was collected by filtration and then washed with toluene (3×150 ml), and then hexane (3×150 ml). The solid particle size was measured by Malvern instrument. The results were shown in Table 1.

Example 2

Example 1 was repeated except that the amount of phthalic anhydride was changed to 4.0 grams. The results are shown in Table 1.

Example 3

Anhydrous magnesium chloride (13.2 g), toluene (204 g), epoxy chloropane (26.6 g), and tributyl phosphate (26.8 g), were introduced into a reactor. The mixture was heated at 60° C. for 5 hours with stirring. Phthalic anhydride (5.0 g) was added to the reactor, and then the solution was stirred for an additional 1 hour at 60° C. The solution was cooled to −25° C. Titanium tetrachloride (261 g) was added dropwise over 1 hour. The solution was heated to 80° C., while a solid product was precipitated. The mixture was maintained at 80° C. for 1 hour. The solid was collected by filtration and then washed with toluene (3×150 ml), and then hexane (3×150 ml). The solid particle size was measured by Malvern instrument. The volume median diameter D(v,0.5) is the diameter where 50% of the distribution is above and 50% is as follows: 1) Two determinations of mean particle size should not differ by more than 5% relative. The shape of the curves in the two determinations should be the same; 2) D(v,0.9), 90% of the volume distribution is below this value; 3) D(v,0.1), 10% of the volume distribution is below this value; 4) The span is the width of the distribution based on the 10%, 50% and 90% quantile. The results are shown in Table 1.

Example 4

Example 3 was repeated except that the amount of toluene was changed to 230 grams. The results are shown in Table 1.

TABLE 1

| Example | PA, g | D10 microns | D50 microns | D90 microns | Span |
|---|---|---|---|---|---|
| 1 | 3.2 | 8.2 | 14.2 | 22.7 | 1.018 |
| 2 | 4.0 | 8.9 | 16.2 | 26.5 | 1.087 |
| 3 | 5.0 | 14.8 | 27.7 | 43.9 | 1.052 |
| 4 | 5.0 + Tol | 21.7 | 34.9 | 53.7 | 0.917 |

Examples 5-8

Examples 5-8 demonstrate the PA effect on the solid catalyst component and the catalyst prepared with di-isononyl phthalate as internal donor.

The solids from Examples 1-4 were treated with a mixture of titanium tetrachloride and toluene (265 ml of 10% vol) and di-isononyl phthalate (5.0 g) for 1 hour at 105° C. After the filtrate was removed, the treatment was repeated three times with the temperature increased to 110° C., and the time reduced to 30 minutes. The solid was washed with hexane (3×150 ml). The solid characteristics were shown in table 2.

TABLE 2

| Example | PA, g | D50 microns | Span | Ti, % | DINP, % |
|---|---|---|---|---|---|
| 5 | 3.2 | 12.4 | 1.093 | 1.69 | 15.5 |
| 6 | 4.0 | 13.5 | 1.030 | 1.51 | 14.6 |
| 7 | 5.0 | 25.0 | 1.054 | 1.28 | 13.9 |
| 8 | 5.0 + Tol | 32.7 | 0.885 | 1.38 | 14.7 |

Bulk Propylene Polymerization

Triethyl aluminum (1.5 cc at 25 wt %), cyclohexylmethyldimethoxysilane (76.8 mmol) and 10 mg of the solid catalyst component dispersed into 1 ml of mineral oil was introduced into a 3.4-liter stainless steel autoclave, which was thoroughly purged with nitrogen. The autoclave was pressurized to 10 psi with nitrogen and 32 mmol of hydrogen. The autoclave was then filled with 1500 ml of liquid propylene and the temperature was raised to 70° C. The temperature was maintained at 70 degrees. Propylene was polymerized for 1 hour. At the end of polymerization, the reactor was cooled down to 35° C. and the polymer was removed. CE refers to catalytic efficiency to produce polypropylene (PP), XS refers to xylene solubles, and BD refers to bulk density. The results are presented in Table 3.

TABLE 3

| Example | CE, kg/g | XS, % | MFI g/10 min | BD g/ml |
|---|---|---|---|---|
| 5 | 45.4 |  | 4.0 | 0.439 |
| 6 | 46.5 |  | 3.7 | 0.407 |
| 7 | 43.1 | 1.75 | 3.3 | 0.409 |
| 8 | 43.3 | 1.84 | 3.6 | 0.403 |

Polymer Morphology Characterization

The polymer samples are characterized by Camsizer instrument. Because PP morphology represents the catalyst morphology, the three parameters of PP morphology (sphericity, symmetry and aspect ratio) collected by Camsizer instrument were used to characterize PP and, therefore, the catalyst morphology.

Camsizer Characteristics:
Sphericity $$SPHT = \frac{4\pi A}{P^2} = \text{Circularity2 (ISO 9276-6)}$$

P—measured perimeter/circumference of a particle projection
A—measured area covered by a particle projection
For an ideal sphere SPHT is expected to be as 1.
Otherwise it is smaller than 1.
Symmetry $$Symm_{0,3} = \frac{1}{2}\left(1 + \min\left(\frac{r_1}{r_2}\right)\right)$$

$r_1$ and $r_2$ are distances from the centre of area to the borders in the measuring direction. For asymmetric particles Symm is <1.

If the centre of area is outside the particle i.e.

$$\frac{r_1}{r_2} < 0$$

Symm is <0.5

$x_{Ma} = r_1 + r_2$ "Symm" is minimum value of measured set of symmetry values from different directions Aspect Ratio $$b/l_{0,2,3} = \frac{x_{cmin}}{x_{Femax}};$$

$x_{e\ min}$ and $x_{Fe\ max}$ out of the measured set of $x_e$ and $x_{Fe}$ values The PP characteristics from Camsizer are presented in Table 4. Sphericity, symmetry and aspect ratio characteristics were increased. The results demonstrate that the PP and catalyst morphology are dramatically improved when PA amount increased from 3.2 g to 5.0 g.

TABLE 4

Polymer morphology data

| Example | PP D50 | Span | SPHT3 | Symm3 | B/L3 |
|---|---|---|---|---|---|
| 5 | 757 | 1.10 | 0.722 | 0.816 | 0.673 |
| 6 | 614 | 0.810 | 0.753 | 0.858 | 0.684 |
| 7 | 840 | 0.720 | 0.772 | 0.846 | 0.697 |
| 8 | 1060 | 0.808 | 0.798 | 0.865 | 0.724 |

Note:

$$\text{Span} = \frac{D[v, 0.9] - D[v, 0.1]}{D[v, 0.5]}$$

Examples 9 and 10 demonstrate the PA effect on the solid catalyst component and the catalyst prepared with di-isobutyl phthalate as internal donor. PA effects include increased particle size, improved polymer (catalyst) morphology, reduced XS level.

The catalyst components were prepared with DNBP as an internal donor and variable amount PA was used. When PA amount changed from 3.2 g to 3.9 g the catalyst component particle size increased, the catalysts XS reduced and the polymer morphology improved.

Example 9

Preparation of a Solid Titanium Catalyst Component

Anhydrous magnesium chloride (13.2 g), toluene (196 g), epoxy chloropane (26.6 g), tributyl phosphate (26.8 g), were introduced into a reactor. The mixture was heated at 60° C. for 5 hours with stirring. Phthalic anhydride (3.2 g) was added to the reactor, and then the solution was stirred for an additional 1 hour at 60° C. The solution was cooled to −25° C. Titanium tetrachloride (261 g) was added dropwise over 1 hour. The solution was heated to 85° C., while a solid product was precipitated. Di-isobutyl phthalate (5.0 g) was added. The mixture was maintained at 85° C. for 1 hour. The solid was collected by filtration and then washed with toluene (3×150 ml). The solid was then treated with a mixture titanium tetrachloride and toluene (265 ml of 10% vol) for 1 hour at 105° C. After the filtrate was removed, the treatment was repeated three times with the temperature increased to 110° C., and the time reduced to 30 minutes. The solid was washed with hexane (3×150 ml). The catalyst characteristics are shown in Table 5.

Example 10

Example 9 was repeated except the amount of phthalic anhydride was changed to 3.9 gram. The results are shown in Table 5.

The catalyst components and catalysts below were prepared with variable amount of PA. The dissolution and precipitation of $MgCl_2$ was conducted as in Example 3 except that toluene PA amounts were changed as recorded in Table 5 below. The $ECH/MgCl_2$ molar ratio was 2/1. Di-isononyl phthalate was used as an internal donor and was added to the process after completion of the precipitation of $MgCl_2$ (2.6 g), during toluene wash (6.5 g) and 3.2 g of DINP was added during the following 10% vol $TiCl_4$/toluene treatment at 95° C. and 110° C. The solid was washed with hexane (3×150 ml).

Bulk propylene polymerization was conducted. The results of bulk propylene polymerization are shown in Table 5.

TABLE 5

| Example | PA, g | D50 Cat | Span | Ti, % | DIBP, % | CE, kg/g | XS, % |
|---|---|---|---|---|---|---|---|
| 9 | 3.2 | 13.8 | 0.81 | 1.87 | 9.4 | 45.5 | 1.99 |
| 10 | 3.9 | 17.8 | 0.96 | 1.75 | 11.2 | 47.7 | 1.79 |

The results in Table 6 show that increasing the amount of PA from 3.2 g to 4.5 g results in increasing particle size, reduction of the catalyst agglomeration (solid catalyst component was screened through 180 microns screen). The catalyst components were used for bulk polymerization. The catalysts demonstrates high activity with reduction of polymer agglomerations (polymer particles more than 2 mm) when the PA amount increases. Also the reduction of XS level is observed.

TABLE 6

| Example | PP D50 | Span | SPHT3 | Symm3 | B/L3 |
|---|---|---|---|---|---|
| 9 | 576 | 0.956 | 0.758 | 0.838 | 0.687 |
| 10 | 686 | 0.767 | 0.774 | 0.847 | 0.696 |

Examples 11-13

Examples 11-13 demonstrate the PA effect on the solid catalyst component and the catalyst prepared with di-isononyl phthalate as an internal donor that was added during in several steps. The molar ratio of $ECH/MgCl_2$ was 2/1.

The catalyst components and catalysts below were prepared with variable amount of PA. The dissolution and precipitation of $MgCl_2$ was conducted as in Example 3 except toluene PA amounts were changed and recoded in table 7. The $ECH/MgCl_2$ molar ratio was 2/1. Di-isononyl phthalate was used as an internal donor and was added to the process after completion of the precipitation of $MgCl_2$ (2.6 g), during toluene wash (6.5 g) and 3.2 g of DINP was added during the following 10% vol TiCl$_4$/toluene treatment at 95° C. and 110° C. The solid was washed with hexane (3×150 ml).

The results in Table 7 show that increasing the amount of PA from 3.2 g to 4.5 g results in increasing particle size, reduction of catalyst agglomeration (solid catalyst component was screened through 180 microns screen). The catalyst components were used for bulk polymerization. The catalysts demonstrated high activity with reduction of polymer agglomerations (polymer particles more than 2 mm) when the PA amount increases. Also the reduction of XS level was observed.

TABLE 7

Effect of increased PA amount on catalyst properties

| Example | Toluene, g | PA, g | Cat D50 | 180 μ % | Ti, % | % DINP | CE, kg/g | XS, % | % PP > 2 mm |
|---|---|---|---|---|---|---|---|---|---|
| 11 | 204 | 3.2 | 16.3 | 1.9 | 1.84 | 18.7 | 44.9 | 2.70 | 3.2 |
| 12 | 204 | 3.9 | 16.9 | 1.0 | 1.75 | 17.8 | 49.2 | 2.65 | 2.5 |
| 13 | 196 | 4.5 | 21.0 | 0 | 1.72 | 17.1 | 47.3 | 2.35 | 1.6 |

Examples 11-18 below demonstrate the effect of PA on catalyst components and catalyst properties when the molar ratio of ECH/MgCl$_2$ was 1/1.

The results in Table 8 below show that increasing the amount of PA from 3.2 g to 5.0 g resulted in increasing particle size and reduction of XS level. All examples demonstrate high activity catalysts.

Example 14-18

Preparation of a Solid Titanium Catalyst Component and Bulk Propylene Polymerization Anhydrous magnesium chloride (13.2 g, toluene (230 g), epoxy chloropane (14.0 g), and tributyl phosphate (34.5 g), were introduced into a reactor. The mixture was heated at 60° C. for 5 hours with stirring. Phthalic anhydride was added to the reactor, and then the solution was stirred for an additional 1 hour at 60° C. The solution was cooled to −25° C. Titanium tetrachloride (261 g) was added dropwise over 1 hour. The solution was heated to 85° C., while a solid product was precipitated. Di-isononyl phthalate (DINP) was used as an internal donor and was added to the process after completion of the precipitation of MgCl$_2$ (2.6 g), during toluene wash (6.5 g) and 3.2 g DINP was added during the following 10% vol TiCl$_4$/toluene treatment at 95° C. and 110° C. The solid was washed with hexane (3×150 ml). The catalyst characteristics are shown in Table 8.

Examples 14-18 demonstrate improvement of isotacticity of the catalyst (increasing XS) with increasing amount of phthalic anhydride used in the process. In addition, the catalyst particle size increased with increasing amount of PA used.

TABLE 8

| Example | PA, g | PA/MgCl$_2$ mole ratio | Ti, % | DINP, % | D50 cat | CE, kg/g | XS, % | BD |
|---|---|---|---|---|---|---|---|---|
| 14 | 3.2 | 0.156 | 1.48 | 16.8 | 22.7 | 55.3 | 2.58 | 0.445 |
| 15 | 3.5 | 0.170 | 1.89 | 19.6 | 29.6 | 55.0 | 2.43 | 0.429 |
| 16 | 3.9 | 0.190 | 1.85 | 18.7 | 34.9 | 49.0 | 2.47 | 0.440 |
| 17 | 4.3 | 0.209 | 1.68 | 20.2 | 39.1 | 50.0 | 2.36 | 0.419 |
| 18 | 5.0 | 0.243 | 1.55 | 16.5 | 44.0 | 49.0 | 2.16 | 0.419 |

Examples below demonstrate the improvement of the catalyst process: Reduction of filtration time with increasing amounts of PA.

Example 19

Preparation of a Solid Titanium Catalyst Component

Anhydrous magnesium chloride (13.2 g, toluene (g), epoxy chloropane (26.6 g), and tributyl phosphate (26.8 g), were introduced into a reactor. The mixture was heated at 60° C. for 5 hours with stirring. Phthalic anhydride (3.2 g) was added to the reactor, and then the solution was stirred for an additional 1 hour at 60° C. The solution was cooled to −25° C. Titanium tetrachloride (261 g) was added dropwise over 1 hour. The solution was heated to 85° C., while a solid product was precipitated. Diisononyl phthalate (2.25 g) was added. The mixture was maintained at 85° C. for 1 hour. The solid was collected by filtration. Filtration time was 3.0 minutes.

Example 20

Preparation of a Solid Titanium Catalyst Component

Example 19 was repeated except the amount of phthalic anhydride was changed to 3.9 grams. The filtration time was 2.0 minutes.

Example 21

Preparation of a Solid Titanium Catalyst Component

Example 19 was repeated except the amount of phthalic anhydride was changed to 4.5 grams. The filtration time was 1.5 minutes.

Examples 22-25

Examples 22-25 illustrate improvement of polymer morphology when PA amount increased in a large batch scale.

The catalyst components were produced as described in Example 14 except a larger scale and different mole ratio of PA/MgCl$_2$ were used.

TABLE 9

| Example | PA/MgCl$_2$ mol | SPHT3 | Symm3 | B/L3 |
|---|---|---|---|---|
| 22 | 0.156 | 0.695 | 0.801 | 0.661 |
| 23 | 0.156 | 0.687 | 0.794 | 0.653 |
| 24 | 0.219 | 0.88 | 0.889 | 0.729 |
| 25 | 0.219 | 0.738 | 0.827 | 0.679 |

Examples 26 and 27

Examples 26 and 27 illustrate improvement of polymer morphology when the TiCl$_4$/toluene wash was used instead the toluene wash. The catalyst components were produced as described in example 14 except 10% vol TiCl$_4$/toluene wash was used instead the toluene wash, a larger scale and different mole ratio of PA/MgCl$_2$ were used.

TABLE 10

TiCl$_4$ Wash

| Example | Comment | PA/MgCl$_2$ mol | PP D50 | Span | SPHT3 | Symm3 | B/L3 |
|---|---|---|---|---|---|---|---|
| 26 | TiCl$_4$-wash | 0.156 | 625 | 0.734 | 0.847 | 0.883 | 0.728 |
| 27 | TiCl$_4$-wash | 0.190 | 838 | 0.467 | 0.852 | 0.883 | 0.732 |

Examples 28-30

Examples 28-30 illustrate the effect of TiCl$_4$ concentration in the wash step on the catalyst isotacticity (XS level): increasing TiCl$_4$/Toluene concentration used in wash step results in decreasing isotacticity of polypropylene produced that make polypropylene useful for film applications.

Example 28

Example 14 was repeated except di-iso octyl phthalate (DIOP) was used as an internal donor and added to the process after completion of the precipitation of MgCl$_2$ (2.6 g), during toluene wash (1.8 g).

Example 29

Example 28 was repeated except the toluene wash was replaced with 25 vol % TiCl$_4$ toluene mixture.

Example 30

Example 28 was repeated except the toluene wash was replaced with 50 vol % TiCl$_4$ toluene mixture.

TABLE 11

| Example | DIOP, % | D50, µ | CE, kg/g | XS, % | MFI | BD, g/ml | D50, µ | Span |
|---|---|---|---|---|---|---|---|---|
| 28 | 12.2 | 17.1 | 40.2 | 3.73 | 5.2 | 0.419 | 750 | 0.91 |
| 29 | 12.1 | 17.6 | 42.3 | 4.37 | 5.0 | 0.435 | 774 | 0.94 |
| 30 | 11.0 | 18.2 | 40.3 | 5.06 | 5.5 | 0.404 | 894 | 0.98 |

Examples 30-31

Examples 30 and 31 illustrate the catalyst preparation, catalyst properties and the relative catalyst composition. The analyzed catalyst composition includes Ti, Mg, internal donor (phthalate) and a secondary electron donor (phthaloyl chloride) formed during the catalyst synthesis by reaction of an auxiliary intermediate electron donor (phthalic anhydride) with TiCl$_4$. The amount phthaloyl chloride in the final catalyst increases with increasing amount phthalic anhydride used.

Examples 31

Preparation of a Solid Titanium Catalyst Component

Anhydrous magnesium chloride (13.2 g), toluene (196 g), epoxy chloropane (26.6 g), tributyl phosphate (26.8 g), and phthalic anhydride (3.2 g) were introduced into a reactor. The mixture was heated at 60° C. for 2 hours with stirring. The solution was cooled to −25° C. Titanium tetrachloride (261 g) was added dropwise over 1 hour. The solution was heated to 85° C., while a solid product was precipitated. Di-isononyl phthalate (2.6 g) was added. The mixture was maintained at 85° C. for 1 hour. The solid was collected by filtration and then a mixture of titanium tetrachloride and toluene (265 ml of 10% vol) was added to reactor. Di-isononyl phthalate (1.8 g) was added. The mixture was heated with agitation at 80° C. for 1 hour. The solid was collected by filtration and then treated with a mixture of titanium tetrachloride and toluene (265 ml of 10% vol) for 1 hour at 95° C. After the filtrate was removed, the treatment was repeated three times with the temperature increased to 105° C., and the time reduced to 30 minutes. The solid was washed with hexane (3×150 ml). The catalyst characteristics are shown in Table 12.

Example 32

Example 31 was repeated except the amount of phthalic anhydride was changed to 4.5 grams

TABLE 12

| Example | Amount of PA used, g | Ti, % | Mg, % | DINP, % | Phthaloyl chloride (PC), % from total internal donors | CE, kg/g | XS, % |
|---|---|---|---|---|---|---|---|
| 31 | 3.2 | 2.40 | 18.04 | 11.7 | 21.1 | 46.6 | 4.15 |
| 32 | 4.5 | 2.18 | 17.98 | 11.9 | 26.6 | 41.8 | 4.23 |

Examples 33-36

Examples 33-36 illustrate the catalyst preparation, catalyst properties and the relative catalyst composition. The analyzed catalyst composition includes Ti, Mg, internal donor (phthalate) and a secondary electron donor (phthaloyl chloride) formed during the catalyst synthesis by reaction of an auxiliary intermediate electron donor (phthalic anhydride) with TiCl$_4$. The results show that the replacement of the toluene wash after the precipitation of MgCl$_2$/TiCl$_4$ complex with 10% TiCl$_4$/toluene wash results in increasing the Ti content, the catalyst activity and amount of phthaloyl chloride in the final catalyst (Examples 33 and 34). Increasing amount of phthalic anhydride from 0.246/MgCl$_2$ (weight) to 0.295/MgCl$_2$ results in increasing the catalyst activity, the catalyst isotacticity and the amount phthaloyl chloride in the final catalyst (Examples 33 and 35). A usage of the increased amount of phthalic anhydride and the TiCl$_4$/toluene wash results in high activity catalyst with high isotacticity and high phthaloyl chloride content (Examples 33 and 36.)

Preparation of a Solid Titanium Catalyst Component and Bulk Propylene Polymerization Anhydrous magnesium chloride, toluene (16.5/MgCl$_2$ weight), epoxy chloropane (2.0/MgCl$_2$ weight), and tributyl phosphate (2.1/MgCl$_2$ weight), were introduced into a reactor. The mixture was heated at 60° C. for 5 hours with stirring. Phthalic anhydride (0.25/MgCl$_2$ weight) was added to the reactor, and then the solution was stirred for an additional 1 hour at 60° C. The solution was cooled to −25° C. Titanium tetrachloride (20.4/MgCl$_2$) was added. The solution was heated to 85° C., while a solid product was precipitated. Di-isononyl phthalate (DINP) was used as an internal donor and was added to the process after completion of the precipitation of the solid (0.19/MgCl$_2$), during toluene wash (0.44/MgCl$_2$) and 0.36/MgCl$_2$ weight DINP was added during the following 10% vol TiCl$_4$/toluene treatment at 95° C. and 110° C. The solid was washed with hexane (3×150 ml). The catalyst characteristics are shown in Table 13.

TABLE 13

| Example | PA/MgCl$_2$ (weight) | Wash step | Ti, % | Mg, % | DINP, % | Phthaloyl chloride (PC), % from total internal donors | CE, kg/g | XS, % | BD | MFI |
|---|---|---|---|---|---|---|---|---|---|---|
| 33 | 0.246 | Toluene | 1.57 | 18.37 | 12.5 | 16.4 | 41.6 | 2.01 | 0.464 | 6.0 |
| 34 | 0.246 | 10% vol TiCl$_4$/Toluene | 1.96 | | 13.2 | 19.4 | 51.9 | 2.71 | 0.489 | |
| 35 | 0.295 | Toluene | 1.62 | 19.54 | 14.8 | 21.7 | 47.1 | 1.91 | 0.438 | 6.5 |
| 36 | 0.295 | 10% vol TiCl$_4$/Toluene | 1.75 | 19.19 | 16.5 | 20.3 | 50.6 | 1.95 | 0.478 | 6.2 |

Example 37

Example 37 illustrates catalyst preparation with addition of phthalic anhydride in two places: during MgCl$_2$ dissolution and during a TiCl$_4$/Toluene wash step.
Preparation of a Solid Titanium Catalyst Component Anhydrous magnesium chloride (13.2 g), toluene (196 g), epoxy chloropropane (26.6 g), tributyl phosphate (26.8 g), and phthalic anhydride (4.5 g) were introduced into a reactor. The mixture was heated at 60° C. for 2 hours with stirring. The solution was cooled to −25° C. Titanium tetrachloride (261 g) was added dropwise over 1 hour. The solution was heated to 85° C., while a solid product was precipitated. Di-isononyl phthalate (2.6 g) was added. The mixture was maintained at 85° C. for 1 hour. The solid was collected by filtration and then a mixture of titanium tetrachloride and toluene (265 ml of 10% vol) was added to the reactor. Di-isononyl phthalate (6.0 g) and phthalic anhydride (2.0 g) were to the reactor. The mixture was heated with agitation at 80° C. for 1 hour. The solid was collected by filtration and then treated with a mixture of titanium tetrachloride and toluene (265 ml of 10% vol) for 1 hour at 105° C. After the filtrate was removed, the treatment was repeated with the temperature increased to 110° C., and the time reduced to 30 minutes. The solid was washed with hexane (3×150 ml). The solid catalyst contains: Ti % −1.87, Mg % −18.13, DINP % −15.2, phthaloyl chloride (% from total donors) −17.0. The catalyst activity is: (k/g) −45.8, XS (%)-2.92.

Examples 38 and 39 illustrate catalyst composition and catalyst properties by variation of TiCl$_4$ treatment conditions.

Example 38

Preparation of a Solid Titanium Catalyst Component

Anhydrous magnesium chloride (13.2 g), toluene (196 g), epoxy chloropropane (26.6 g), tributyl phosphate (26.8 g), and phthalic anhydride (4.5 g) were introduced into a reactor. The mixture was heated at 60° C. for 2 hours with stirring. The solution was cooled to −25° C. Titanium tetrachloride (261 g) was added dropwise over 1 hour. The solution was heated to 85° C., while a solid product was precipitated. Di-isononyl phthalate (2.6 g) was added. The mixture was maintained at 85° C. for 1 hour. The solid was collected by filtration and then a mixture titanium tetrachloride and toluene (265 ml of 10% vol) was added to the reactor. The mixture was heated with agitation at 85° C. for 0.5 hour. The solid was collected by filtration and then treated with a mixture of titanium tetrachloride and toluene (265 ml of 10% vol) in the presence of di-isononyl phthalate (4.5 g) for 1 hour at 105° C. After the filtrate was removed, the solid was washed with hexane (3×150 ml).

Example 39

Example 38 was repeated except the final catalyst was additionally treated with 10% vol TiCl$_4$/Toluene at 110° C. for 30 min

TABLE 14

| Example | Ti, % | Mg, % | DINP, % | Phthaloyl chloride (PC), % from total internal donors | CE, kg/g | XS, % | MFI |
|---|---|---|---|---|---|---|---|
| 38 | 1.80 | 17.2 | 15.3 | 19.2 | 42.1 | 2.60 | 4.9 |
| 39 | 1.48 | 17.9 | 16.7 | 15.3 | 41.3 | 2.01 | 6.9 |

Example 40

9.5 g of the solid precipitated support was obtained as described in example 14 washed with 133 ml of 10% vol TiCl$_4$/Toluene and 1.25 g of 1,8-naphthyl dibenzoate at 90° C. for 60 min. Then the solid was treated with 133 ml of 10% vol TiCl$_4$/Toluene and 0.50 g of 1,8-naphthyl dibenzoate at 105° C. for 60 min. Additional treatment was conducted with 133 ml of 10% vol TiCl$_4$/Toluene at 110° C. for 30 min (two times). The solid was washed with hexane (3×150 ml). The solid catalyst contains: Ti % −3.62, Mg %-16.92, 1,8-naphthyl dibenzoate %-17.3, phthaloyl chloride (% from total donors) −20.8. The catalyst activity is: (k/g) −41.4, XS (%)-2.19.

Example 41

9.5 g of the solid precipitated support was obtained as described in example 14 washed with 133 ml of 10% vol TiCl$_4$/Toluene at 80° C. for 30 min. Then the solid was treated with 133 ml of 10% vol TiCl$_4$/Toluene and 5.5 g of 1-[9-(methoxymethyl)fluoren-9-yl]hexan-1-one at 105° C. for 60 min. Additional treatment was conducted with 133 ml of 10% vol TiCl$_4$/Toluene at 110° C. for 30 min (two times). The solid was washed with hexane (3×150 ml). The solid catalyst contains 1-[9-(methoxymethyl)fluoren-9-yl]hexan-1-one %-17.7, The catalyst activity is: (k/g) −56.4, XS (%)-3.23.

What is claimed is:
1. Catalyst particles for use in olefinic polymerization formed by a process comprising the following steps:
 (a) dissolving a magnesium compound and an auxiliary intermediate electron donor in at least one first solvent to form a first mixture;

(b) contacting a first titanium compound with said first mixture to form a precipitate of the magnesium compound and the first titanium compound;

(c) separating the precipitate from said first mixture and removing side products from the precipitate prior to step (d) by washing the precipitate with a second mixture comprising a second titanium compound and at least one second solvent and optionally an electron donor at a wash temperature below 90° C. to generate a washed precipitate, wherein said washing is performed without performing any intervening washes or reactions of the precipitate in between said separating and said washing; and (d) activating the washed precipitate by treating the washed precipitate with a third mixture of a third titanium compound and at least one third solvent at an activation temperature of 90-150° C. to form the catalyst particles, wherein the catalyst particles and resultant polymer particles produced therefrom each have a sphericity, symmetry, and aspect ratio greater than 0.8;

wherein one or more of: 1) the first titanium compound, 2) the second titanium compound, 3) the third titanium compound, or 4) the magnesium compound comprise a chlorine atom;

wherein said auxiliary intermediate electron donor is converted to a secondary electron donor with the chlorine atom through a reaction of the auxiliary intermediate electron donor with the one or more of: 1) the first titanium compound, 2) the second titanium compound, 3) the third titanium compound, or 4) the magnesium compound, and wherein the secondary electron donor with the chlorine atom is present in the catalyst particles in an amount ranging from about 0.1 wt % to about 10 wt % based on the catalyst particles.

2. The catalyst particles of claim 1, wherein at least one of said first, second, or third titanium compound is a titanium halide.

3. The catalyst particles of claim 2, wherein said titanium halide is $TiCl_4$.

4. The catalyst particles of claim 1, wherein in step (a) said at least one first solvent comprises at least one compound selected from the group consisting of alcohol, epoxy compound, and phosphorus compound.

5. The catalyst particles of claim 4, wherein the epoxy compound comprises at least one compound selected from the group consisting of aliphatic epoxy compounds, alicyclic epoxy compounds, and aromatic epoxy compounds.

6. The catalyst particles of claim 5, wherein step (b), (c) and/or (d) further comprises adding an electron donor and/or an auxiliary intermediate electron donor.

7. The catalyst particles of claim 6, wherein said electron donor is a carboxylic acid ester or organic compound containing keto and ether groups.

8. The catalyst particles of claim 7, wherein said carboxylic acid ester is a phthalate.

9. The catalyst particles of claim 1, wherein in step (c) and/or (d) said at least one second solvent and/or said at least one third solvent comprises a compound selected from the group consisting of toluene and ethyl benzene.

10. The catalyst particles of claim 1, wherein in step (c) said second titanium compound is at a concentration of from about 5% to about 50% of the second mixture.

11. The catalyst particles of claim 2, wherein said auxiliary intermediate electron donor reacts with titanium halide to form the secondary electron donor with the chlorine atom, and wherein said auxiliary intermediate electron donor is selected from a group consisting of aldehydes, anhydrides, ketones, and esters.

12. The catalyst particles of claim 1, wherein the magnesium compound comprises at least one compound selected from the group consisting of magnesium chloride, magnesium bromide, magnesium iodide, magnesium fluoride, methoxy magnesium chloride, ethoxy magnesium chloride, isopropoxy magnesium chloride, butoxy magnesium chloride, octoxy magnesium chloride, phenoxy magnesium chloride, methylphenoxy magnesium chloride, ethoxy magnesium, isopropoxy magnesium, butoxy magnesium, n-octoxy magnesium, 2-ethyloxy magnesium, phenoxy magnesium, dimethylphenoxy magnesium, magnesium laurate and magnesium stearate.

13. The catalyst particles of claim 1, wherein said auxiliary intermediate electron donor is phthalic anhydride.

14. The catalyst particles of claim 1, wherein said magnesium compound is $MgCl_2$.

15. A method of polymerizing or copolymerizing an olefin to produce polymer particles, comprising the steps of:

contacting the olefin with a catalyst system made by a process comprising the following steps:

(a) dissolving a magnesium compound and an auxiliary intermediate electron donor in at least one first solvent to form a first mixture;

(b) contacting a first titanium compound with said first mixture to form a precipitate of the magnesium compound and the first titanium compound;

(c) separating the precipitate from said first mixture and removing side products from the precipitate prior to step (d) by washing the precipitate with a second mixture comprising a second titanium compound and at least one second solvent and optionally an electron donor at a wash temperature below 90° C. to generate a washed precipitate, wherein said washing is performed without performing any intervening washes or reactions of the precipitate in between said separating and said washing;

(d) activating the washed precipitate by treating the washed precipitate with a third mixture of a third titanium compound and at least one third solvent at an activation temperature of 90-150° C. to form a solid catalyst component; and (e) contacting the solid catalyst component with an external electron donor compound and organoaluminum compound to form the catalyst system, wherein the solid catalyst component and the polymer particles each have a sphericity, symmetry, and aspect ratio greater than 0.8;

wherein one or more of: 1) the first titanium compound; 2) the second titanium compound; 3) the third titanium compound, or 4) the magnesium compound comprise a chlorine atom;

wherein said auxiliary intermediate electron donor is converted to a secondary electron donor with the chlorine atom through a reaction of the auxiliary intermediate electron donor with the one or more of: 1) the first titanium compound, 2) the second titanium compound, 3) the third titanium compound, or 4) the magnesium compound, and wherein the secondary electron donor with the chlorine atom is present in the catalyst particles in an amount ranging from about 0.1 wt % to about 10 wt % based the catalyst particles.

16. The method of claim 15, wherein at least one of said first, second, or third titanium compound is a titanium halide.

17. The method of claim 15, wherein in step (a) said at least one first solvent comprises at least one compound selected from the group consisting of alcohol, epoxy compound, and phosphorus compound.

18. The method of claim 17, wherein the epoxy compound comprises at least one compound selected from the group consisting of aliphatic epoxy compounds, alicyclic epoxy compounds, and aromatic epoxy compounds.

19. The method of claim 15, wherein in step (c) said second titanium compound is at a concentration of from about 5% to about 50% of the second mixture.

20. The method of claim 16, wherein said auxiliary intermediate electron donor reacts with titanium halide to form the secondary electron donor with the chlorine atom, and wherein the auxiliary intermediate electron donor is selected from a group consisting of aldehydes, anhydrides, ketones, and esters.

\* \* \* \* \*